G. L. BADGER.
INTERNAL COMBUSTION ENGINE.
APPLICATION FILED JUNE 24, 1918.

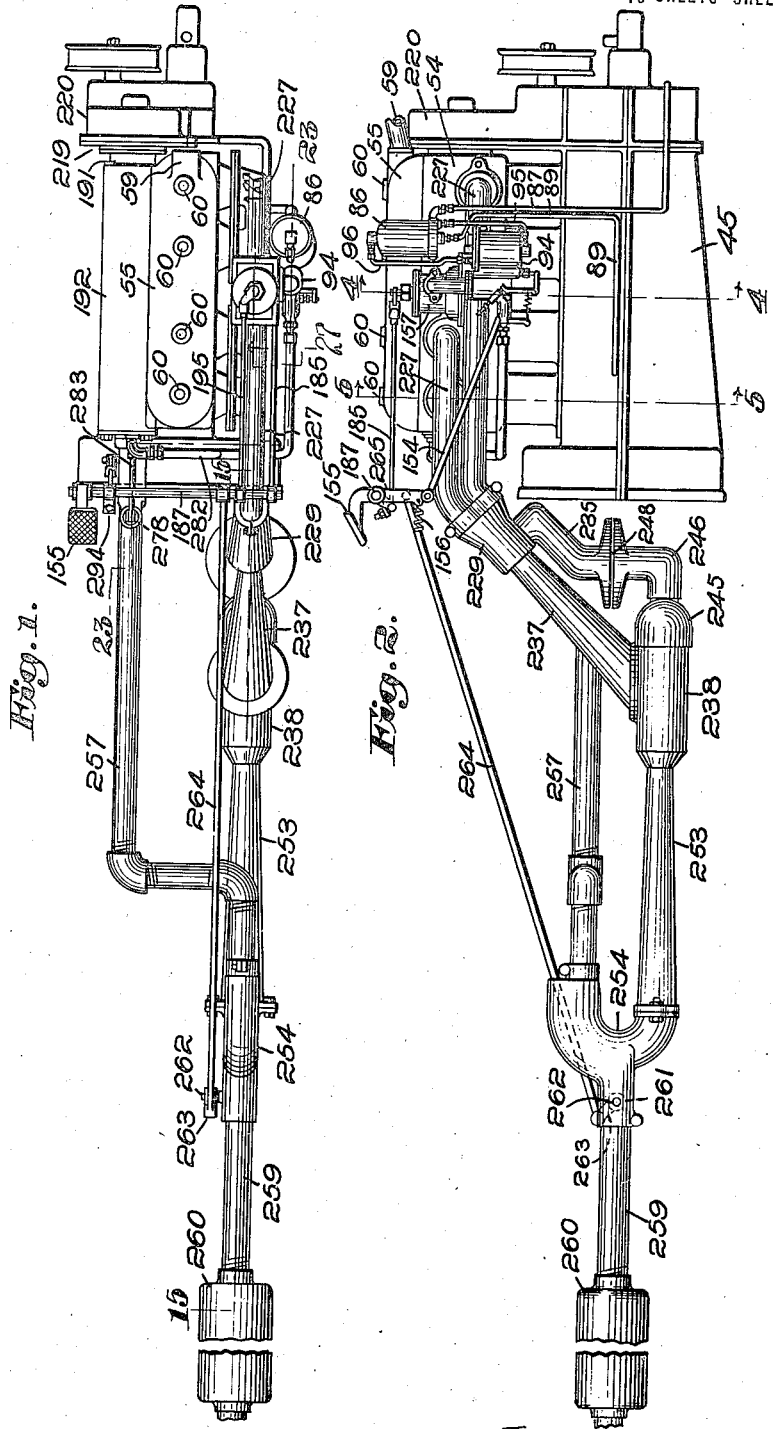

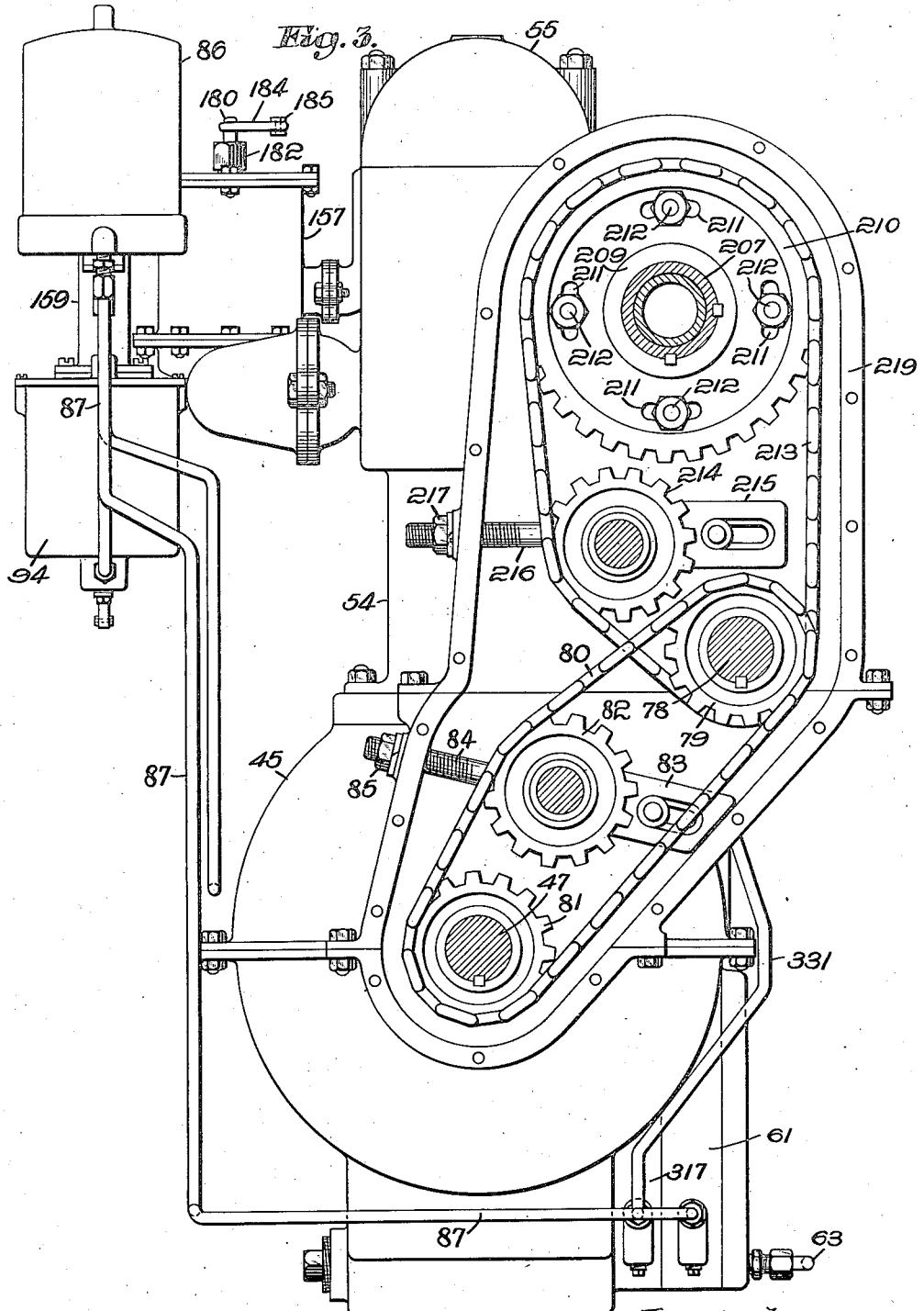

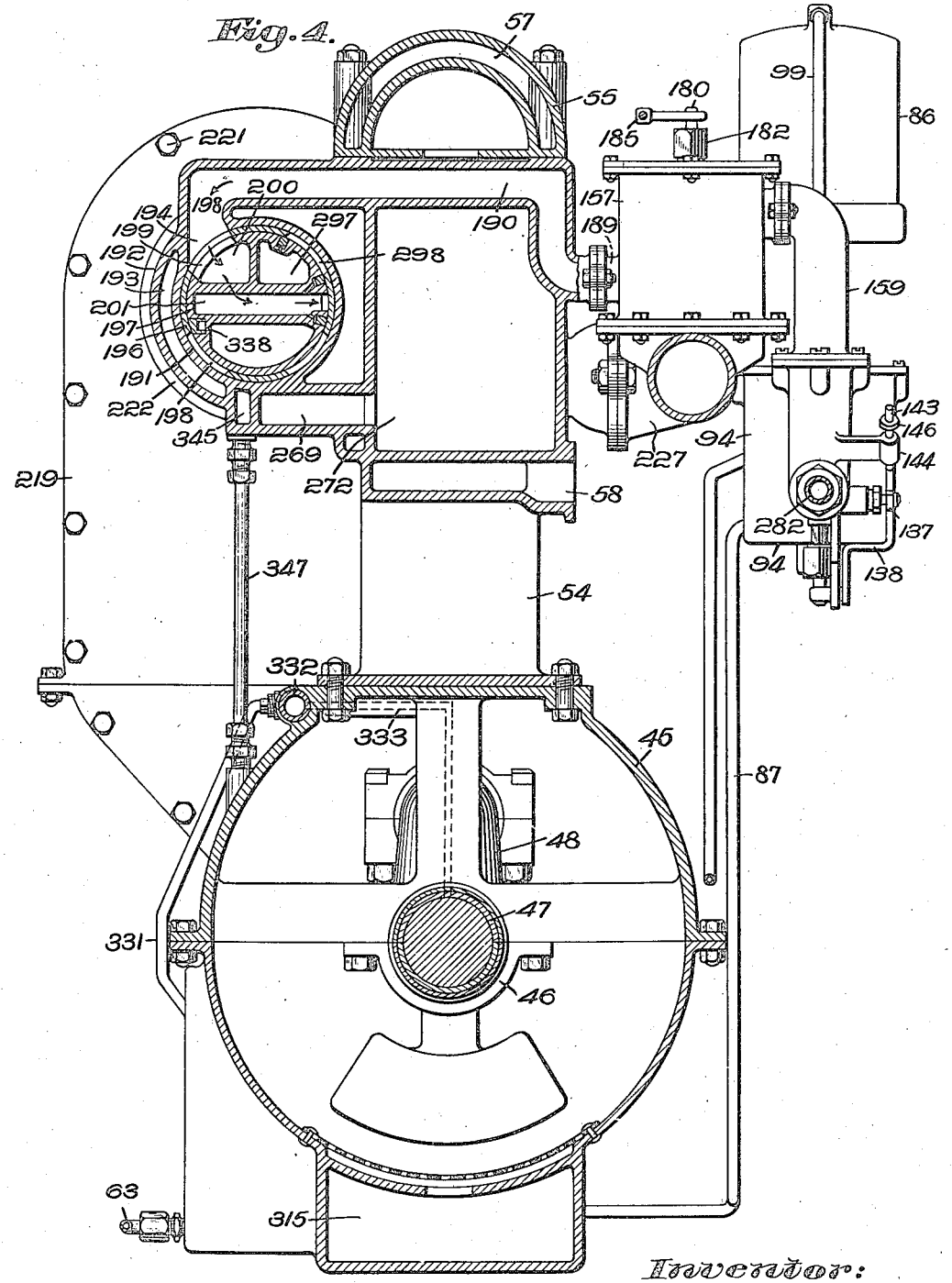

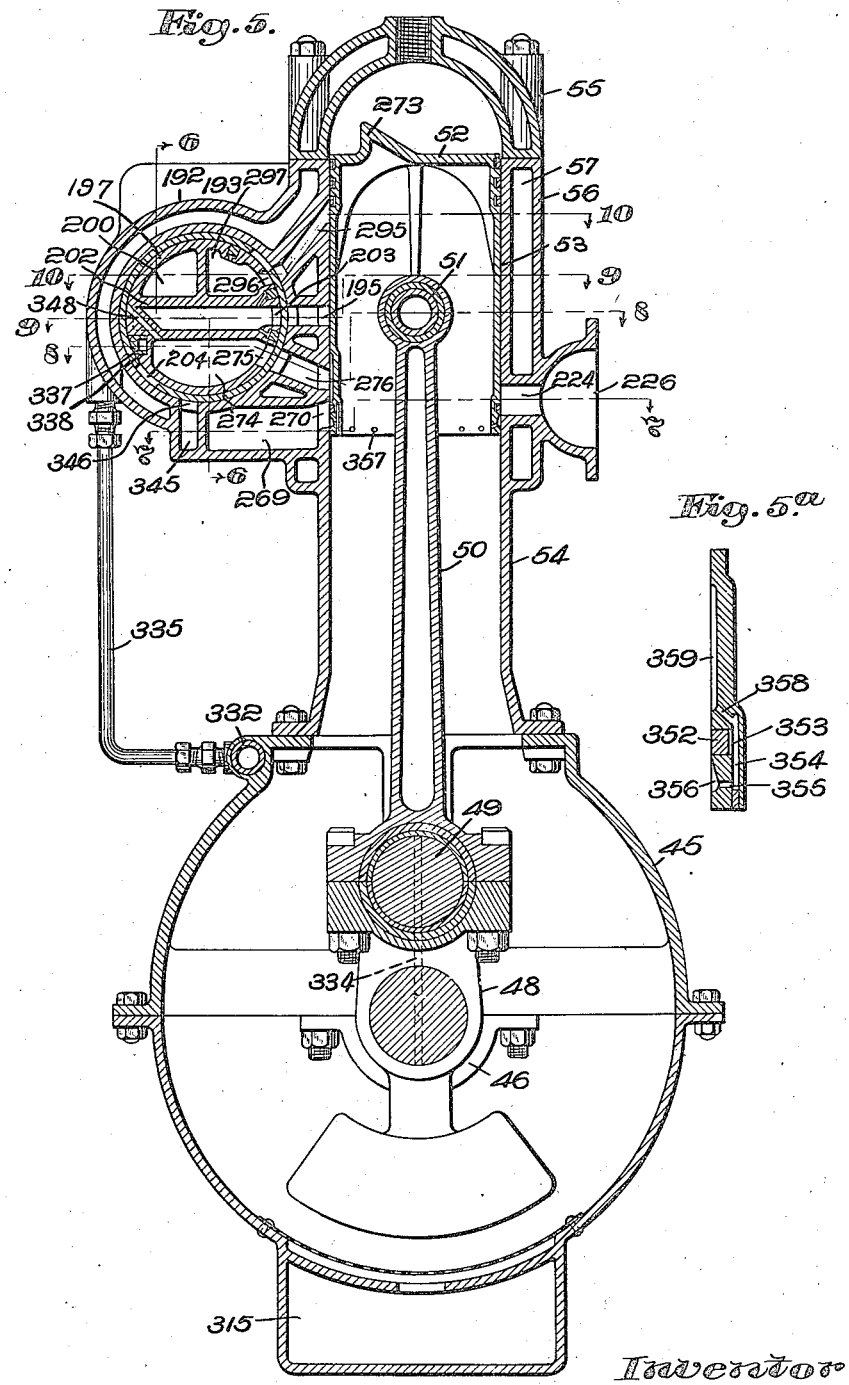

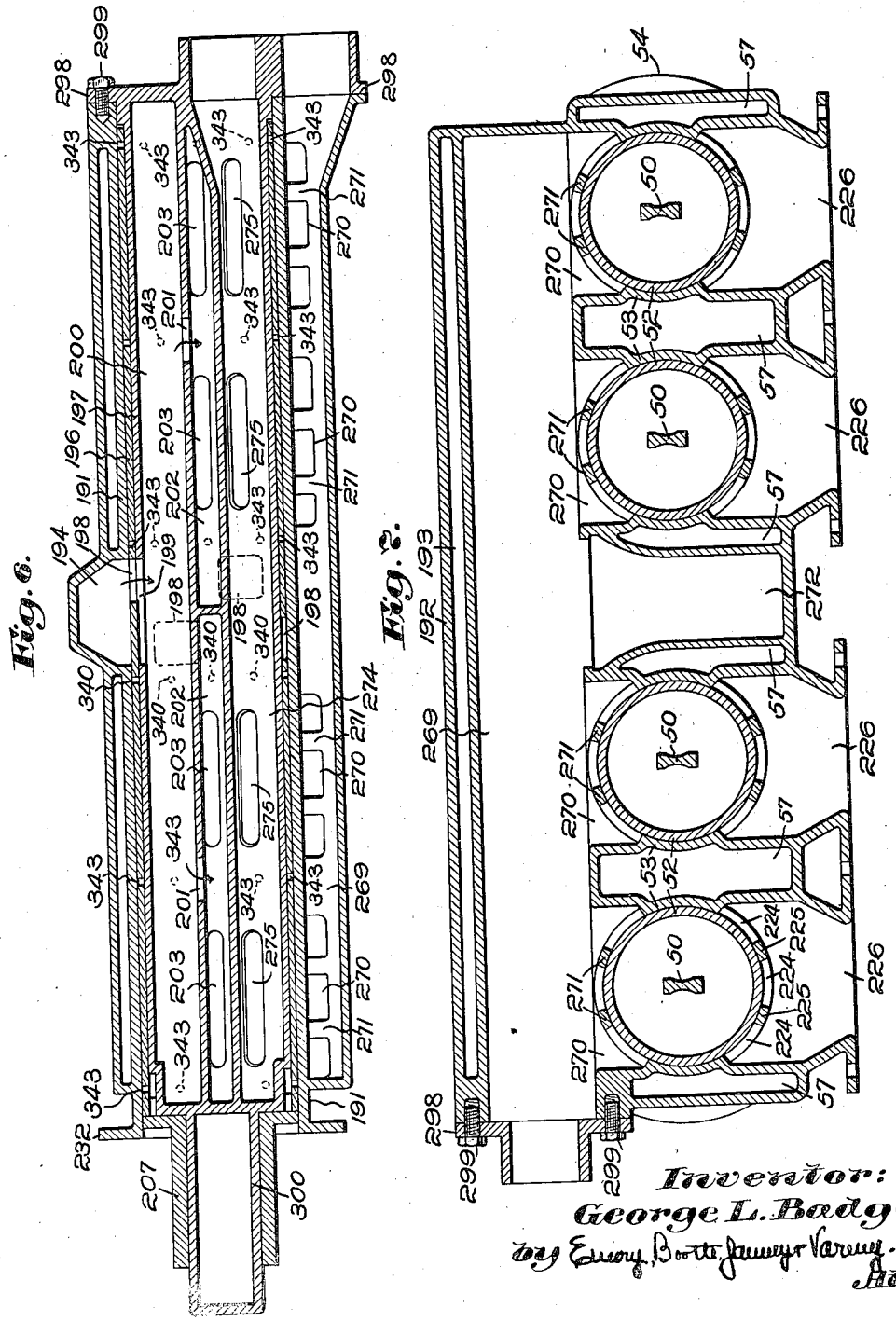

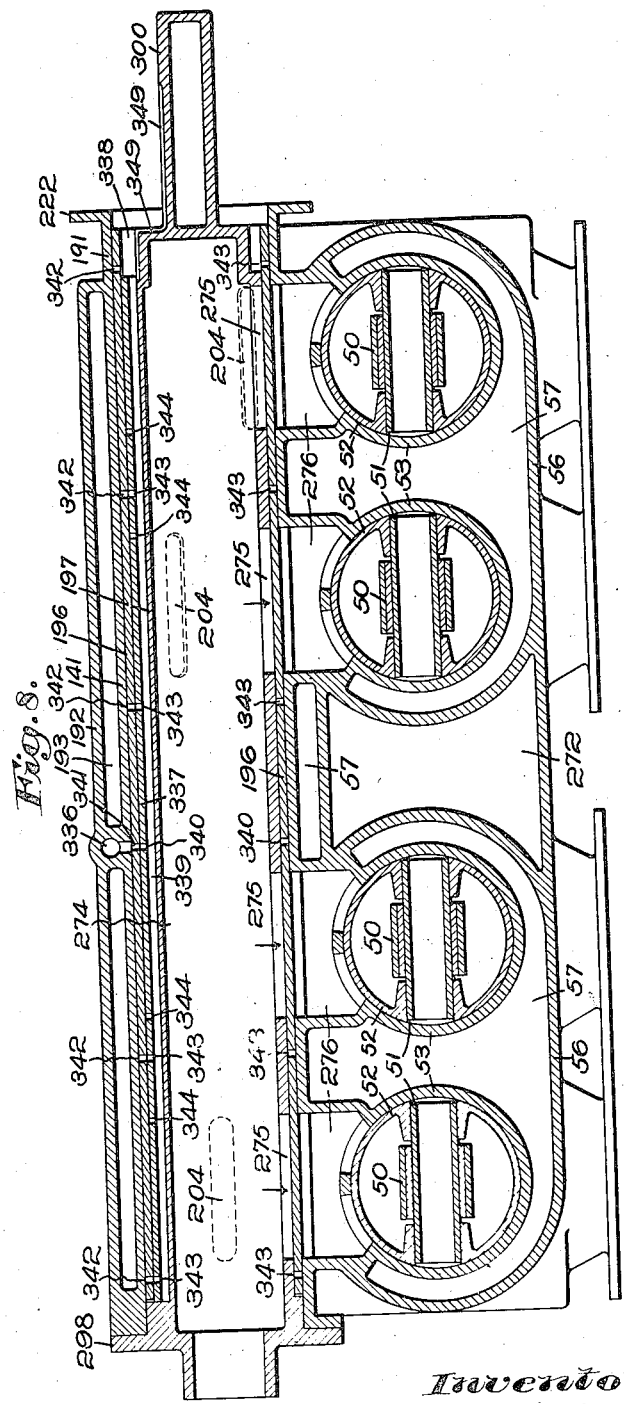

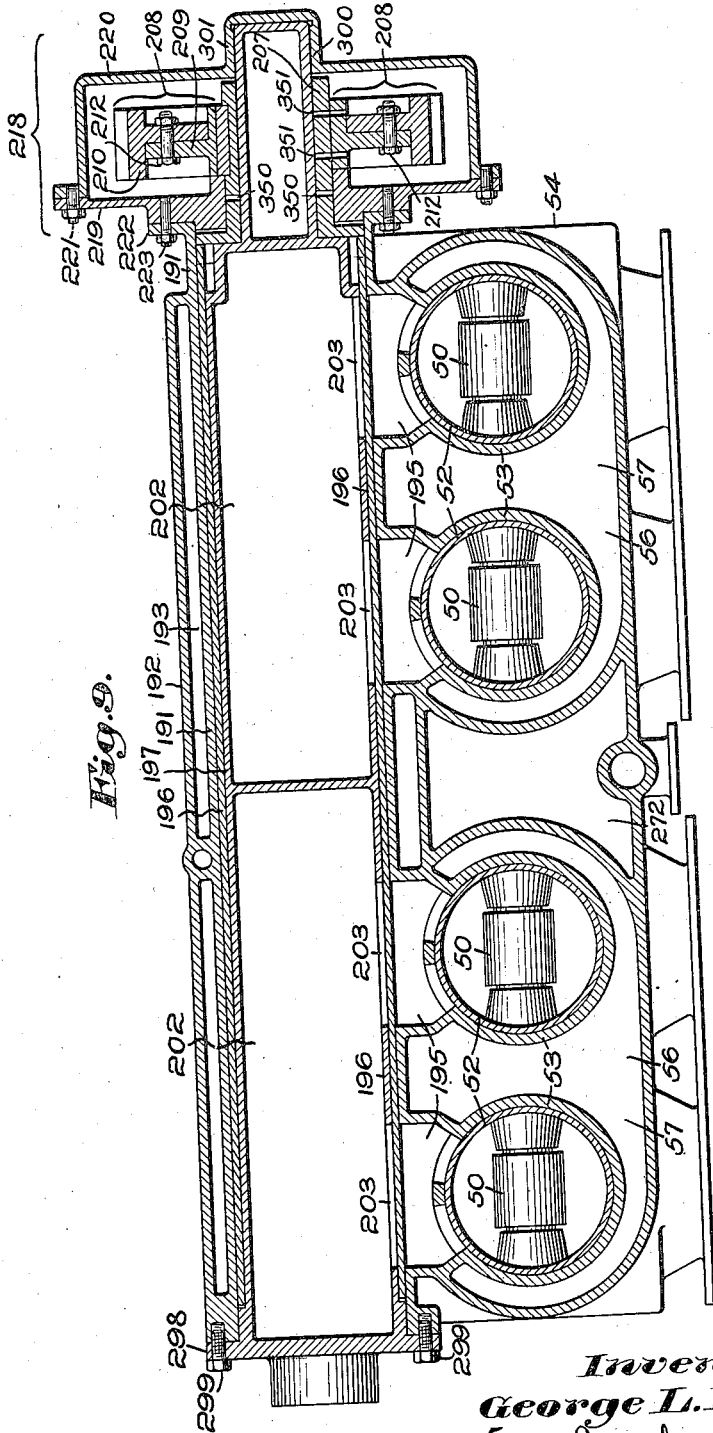

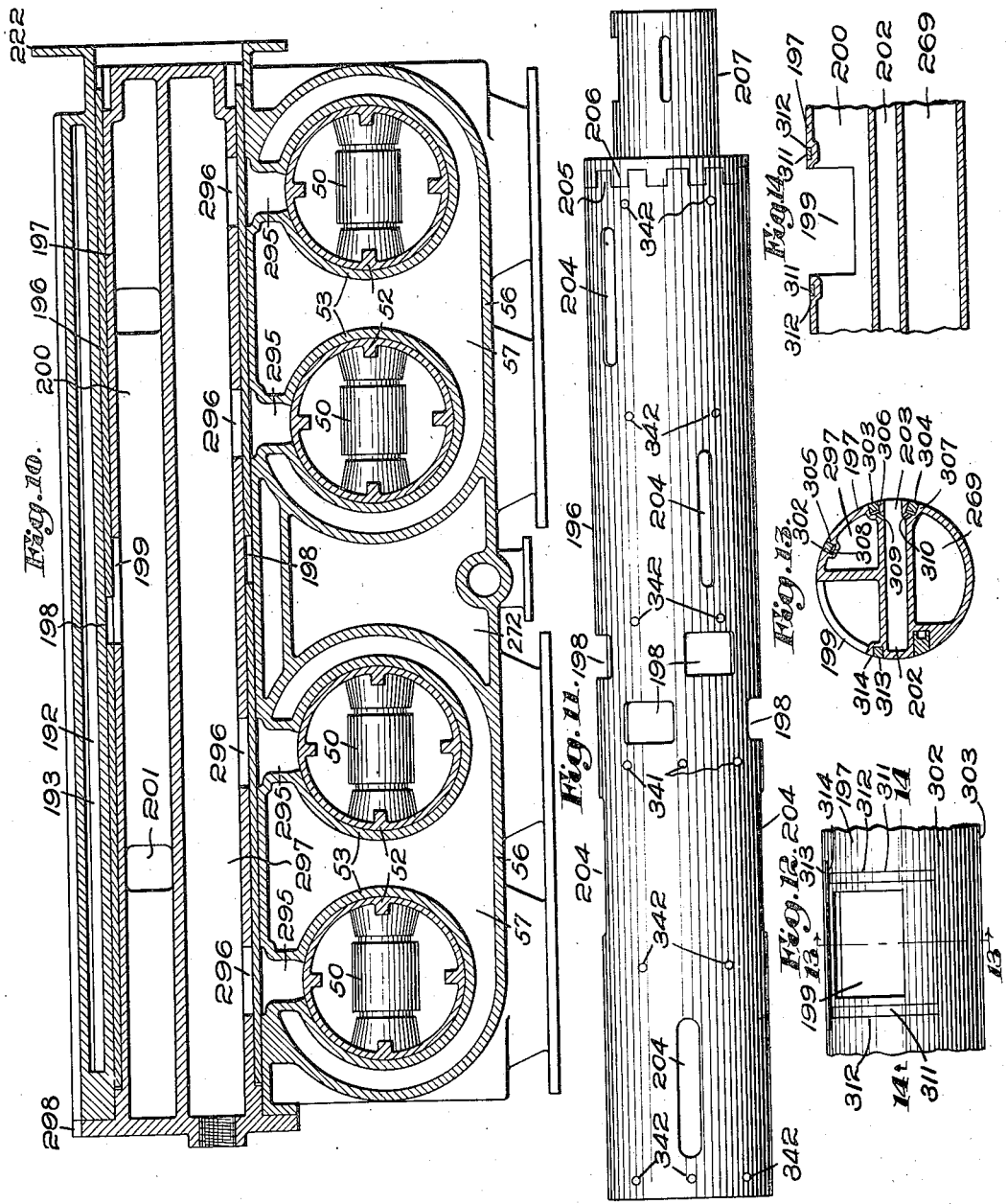

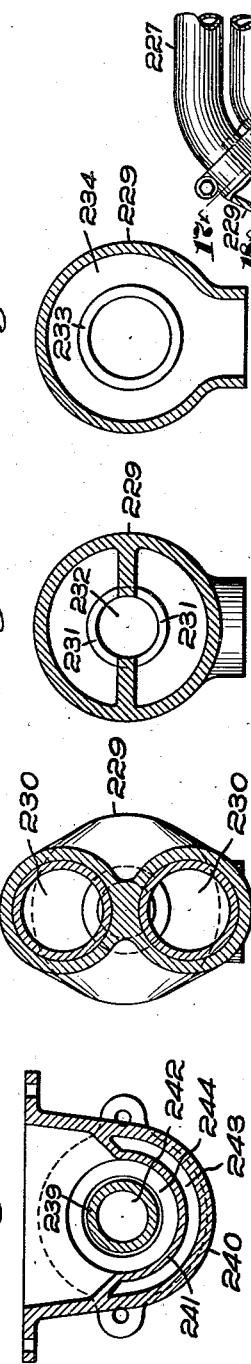
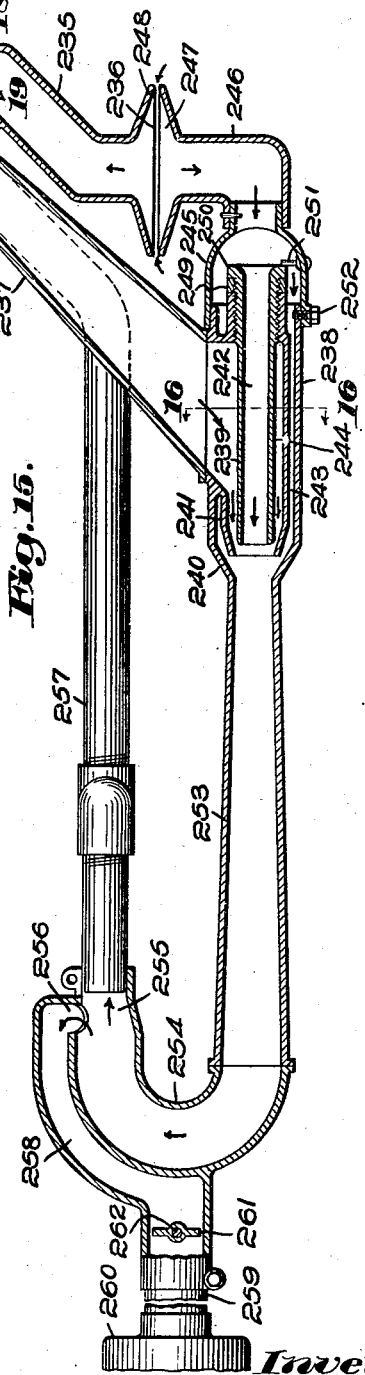

1,413,213.

Patented Apr. 18, 1922.
15 SHEETS—SHEET 10.

Inventor:
George L. Badger,
by Emery, Booth, Janney & Varney, Attys.

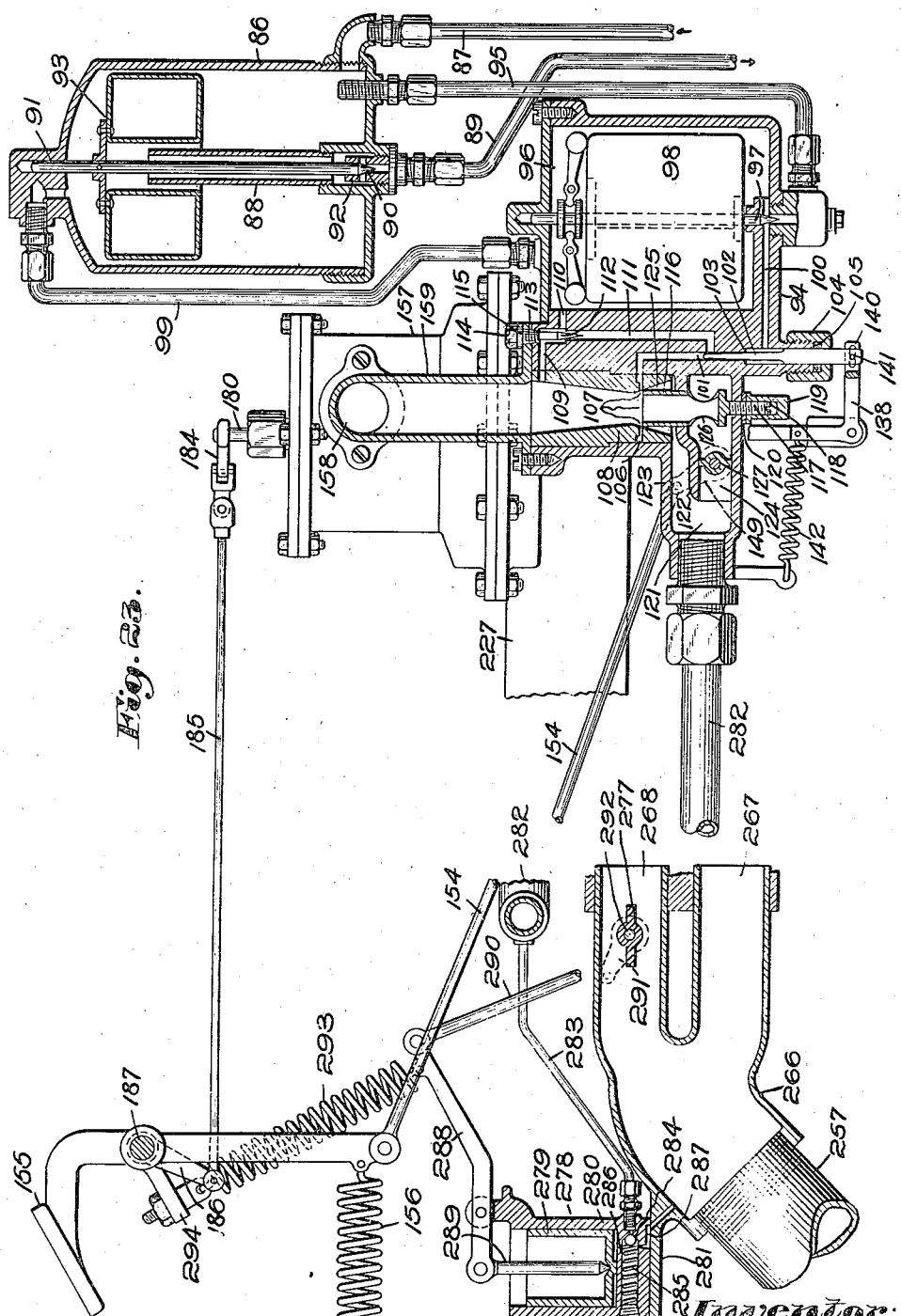

G. L. BADGER.
INTERNAL COMBUSTION ENGINE.
APPLICATION FILED JUNE 24, 1918.
1,413,213.
Patented Apr. 18, 1922.
15 SHEETS—SHEET 12.
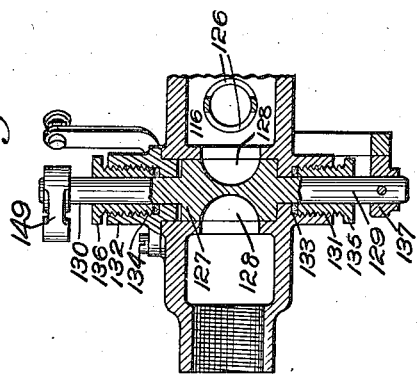
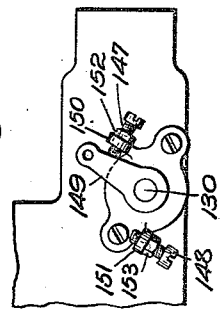
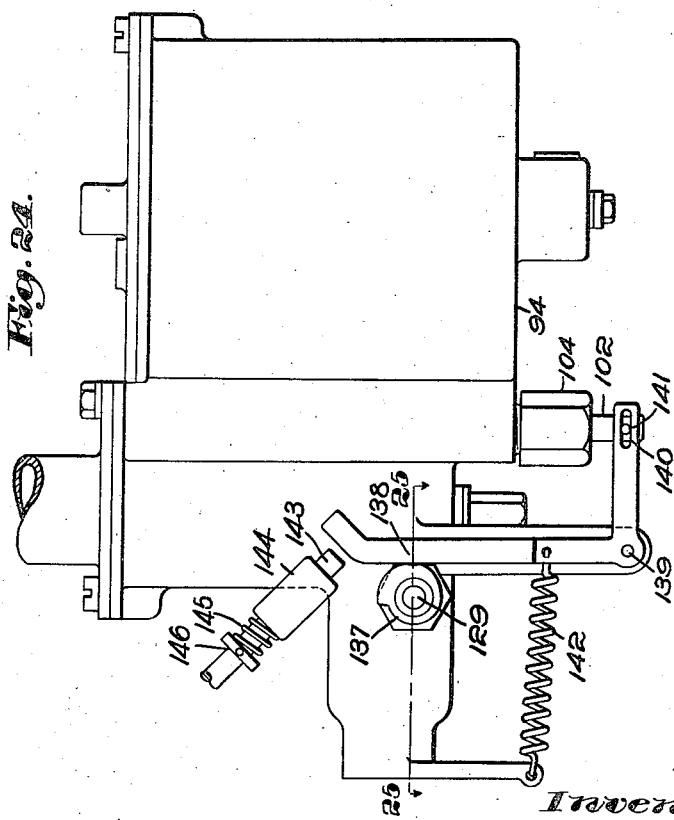
Inventor:
George L. Badger,
by Emery, Booth, Janney & Varney
Attys

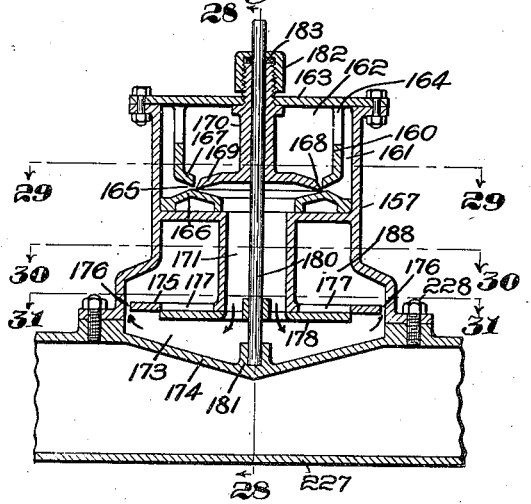
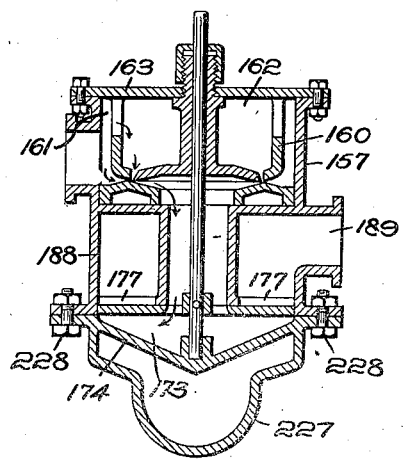
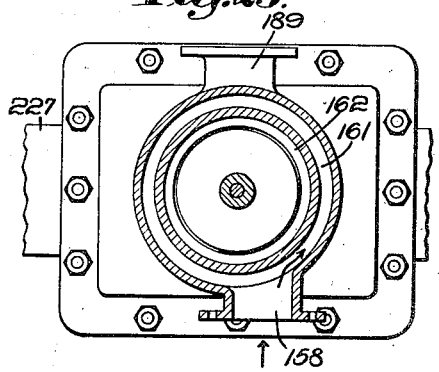
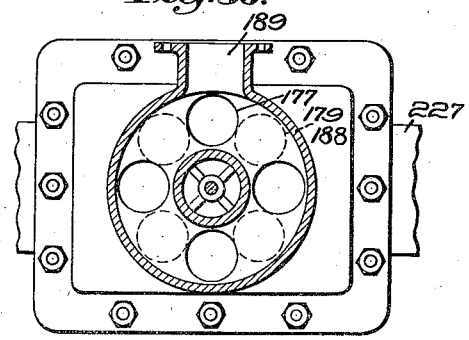
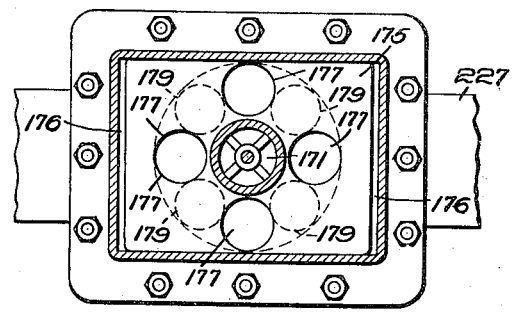

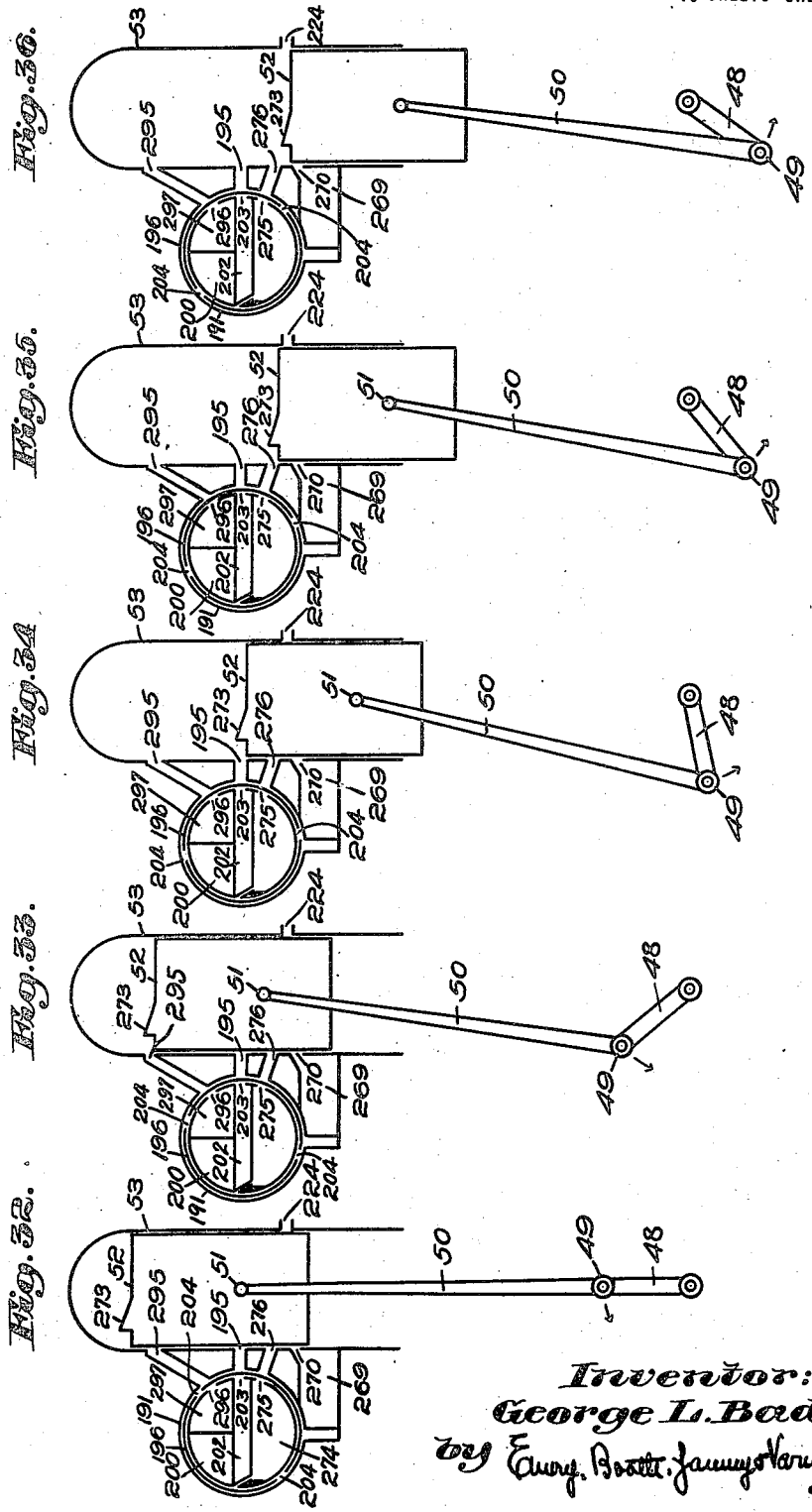

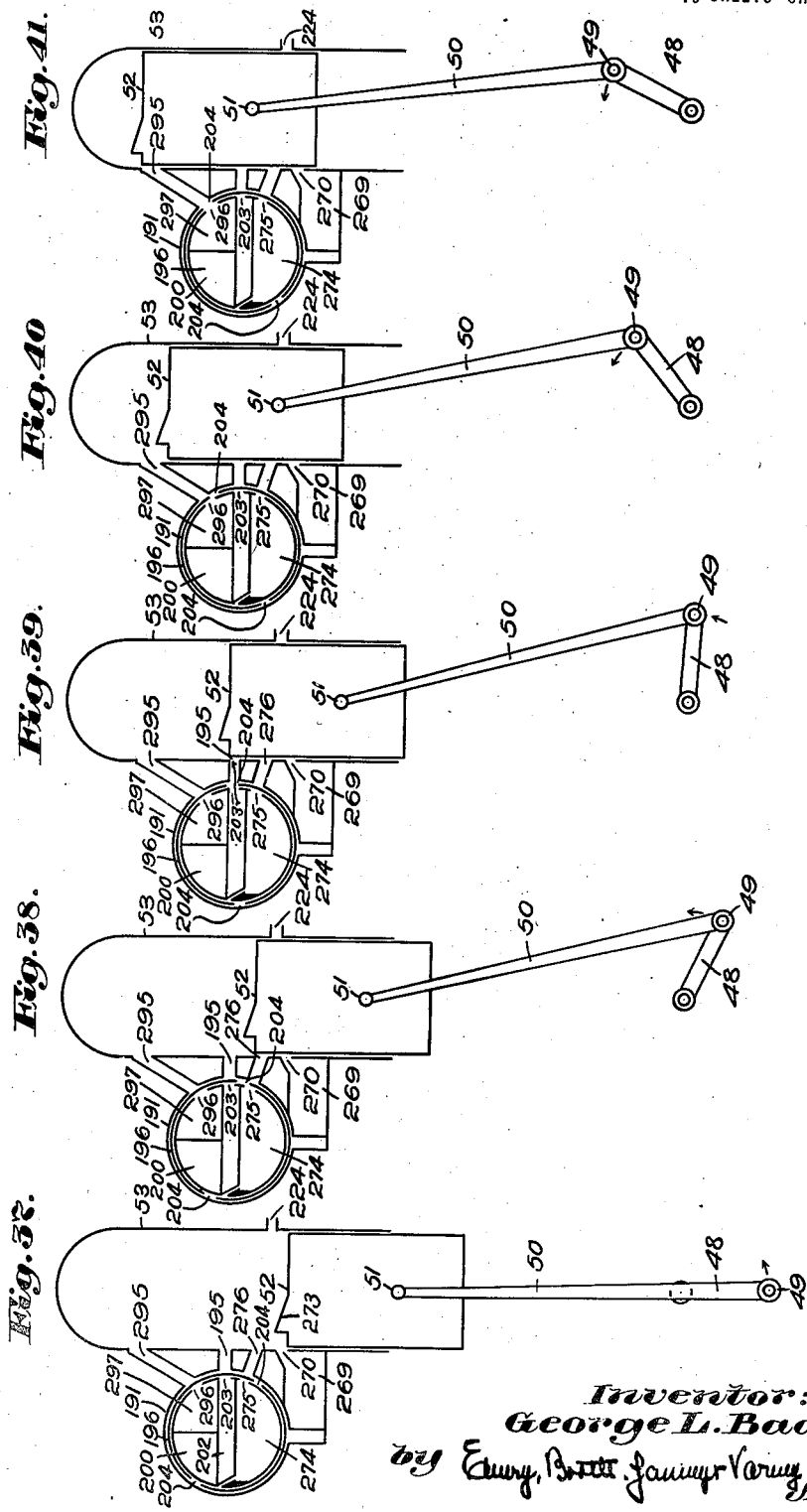

UNITED STATES PATENT OFFICE.

GEORGE L. BADGER, OF QUINCY, MASSACHUSETTS, ASSIGNOR TO HOLLIDGE, BADGER CORPORATION, OF BOSTON, MASSACHUSETTS, A CORPORATION OF MASSACHUSETTS.

INTERNAL-COMBUSTION ENGINE.

1,413,213.　　　　　　Specification of Letters Patent.　　Patented Apr. 18, 1922.

Application filed June 24, 1918. Serial No. 241,507.

*To all whom it may concern:*

Be it known that I, GEORGE L. BADGER, a citizen of the United States, and a resident of Quincy, in the county of Norfolk and State of Massachusetts, have invented an Improvement in Internal-Combustion Engines, of which the following description, in connection with the accompanying drawings, is a specification, like characters on the drawings representing like parts.

This invention relates to internal combustion engines, being more especially concerned with two-stroke engines operating on a constant-volume cycle, and will be best understood by reference to the following description, when taken in connection with the accompanying drawings of one specific embodiment thereof, while its scope will be more particularly pointed out in the appended claims.

In the drawings:

Fig. 1 is a plan of an internal combustion engine embodying my invention;

Fig. 2 is a side elevation of the same;

Fig. 3 is a front elevation of the engine on a much enlarged scale, with the front cover-plate removed;

Fig. 4 is a sectional view on a much enlarged scale, on line 4—4 of Fig. 2, looking toward the right, but with the carbureter and vaporizer in elevation;

Fig. 5 is a sectional view on line 5—5 of Fig. 2, but with the carbureter and vaporizer omitted;

Figure 20:
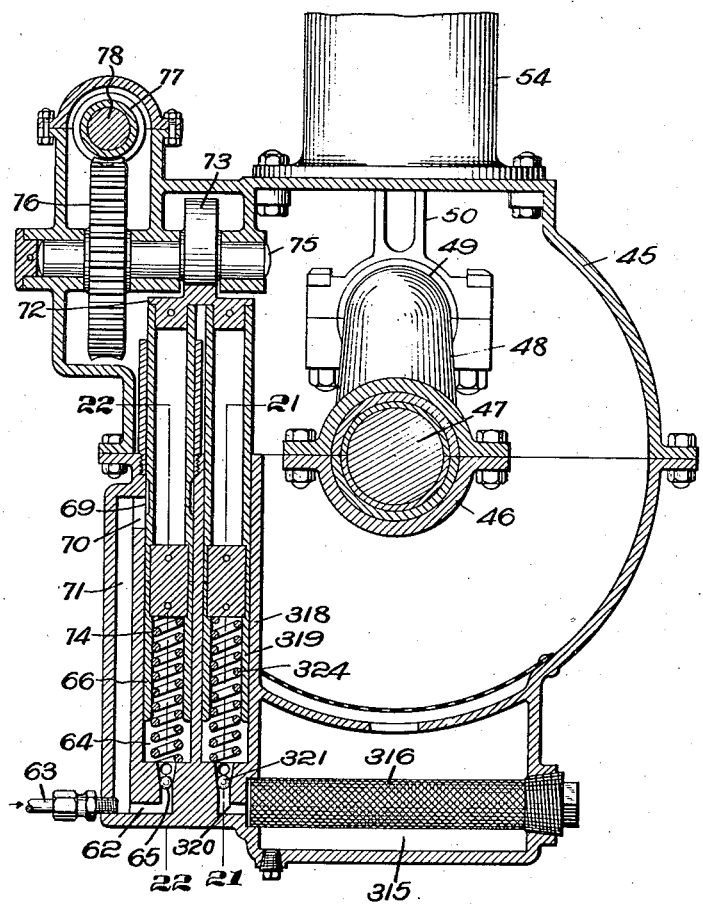
Figure 21:
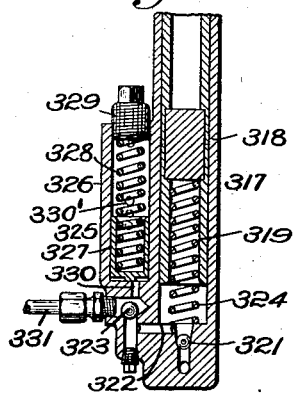
Figure 22:
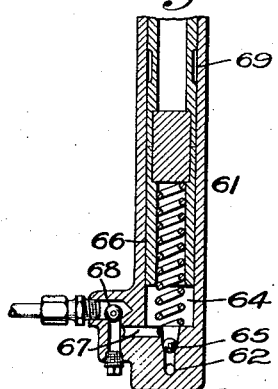

Fig. 5ᵃ is a detail view on an enlarged scale of a portion of Fig. 5, illustrating a means for preventing oil from working upward past the pistons;

Fig. 6 is a sectional view on line 6—6 of Fig. 5, looking toward the right;

Fig. 7 is a plan section on line 7—7 of Fig. 5;

Fig. 8 is a plan section on line 8—8 of Fig. 5;

Fig. 9 is a plan section on line 9—9 of Fig. 5;

Fig. 10 is a plan section on line 10—10 of Fig. 5;

Fig. 11 is a plan of the sleeve valve;

Fig. 12 is a plan of a portion of the core, which the sleeve valve surrounds;

Fig. 13 is a sectional view on line 13—13 of Fig. 12;

Fig. 14 is a sectional view on line 14—14 of Fig. 12;

Fig. 15 is a sectional view on line 15—15 of Fig. 1;

Fig. 16 is a sectional view on line 16—16 of Fig. 15;

Fig. 17 is a sectional view on line 17—17 of Fig. 15;

Fig. 18 is a sectional view on line 18—18 of Fig. 15;

Fig. 19 is a sectional view on line 19—19 of Fig. 15;

Fig. 20 is a transverse, vertical, sectional view of the crank-case and the fuel and lubricating oil pumps;

Fig. 21 is a detail sectional view of the lubricating oil pump on line 21—21 of Fig. 20;

Fig. 22 is a detail sectional view of the fuel pump on line 22—22 of Fig. 20;

Fig. 23 is a sectional view of the fuel supply system, partly broken away, on line 23—23 of Fig. 1;

Fig. 24 is an elevation of the carbureter on an enlarged scale, viewed from the same direction as Fig. 2;

Fig. 25 is a sectional view on line 25—25 of Fig. 24, illustrating the throttle valve;

Fig. 26 is an elevation of a portion of the carbureter viewed from the opposite direction to Fig. 24, and illustrating the limiting stops for the throttle valve;

Fig. 27 is a sectional view on an enlarged scale on line 27—27 of Fig. 1, illustrating the atomizer and vaporizer;

Fig. 28 is a sectional view on line 28—28 of Fig. 27;

Fig. 29 is a plan section on line 29—29 of Fig. 27;

Fig. 30 is a plan section on line 30—30 of Fig. 27;

Fig. 31 is a sectional view on line 31—31 of Fig. 27; and

Figs. 32 to 41, inclusive, are diagrams illustrating the operating of the engine.

*General features.*

Referring to the drawings, and to the embodiment of my invention which is illustrated therein, I have there shown an internal combustion engine having a crank-case 45, which may be of any usual or desired construction, having a plurality of crankshaft bearings 46, one of which is shown in Fig. 4. In these bearings, is journaled a crankshaft 47, provided with a plurality of cranks 48, having crank-pins 49, one of which is shown in Fig. 5. Connecting rods 50, one of which is shown in Fig. 5, connect the respective crank-pins to wrist-pins 51 carried by pistons 52.

The pistons work in cylinders 53, which may be, and are in the present example, cast en bloc, in the form of a cylinder casting 54 superimposed on the crank-case 45. Preferably, the cylinders are provided with a detachable cylinder head 55, best shown in Figs. 1 and 2. Any suitable cooling system may be employed, but herein I have provided a water jacket 56, enclosing a water space 57 to receive circulating water through an inlet 58, best shown in Fig. 4, and to discharge the same through an outlet 59, best shown in Figs. 1 and 2.

When the engine has four cylinders, as in the present example, the cylinders are preferably fired in 1—3—2—4 order, the crank-shaft being appropriately made to this end. Any usual or desired ignition system may be employed, and in the present example, I have shown usual spark plugs 60, one for each cylinder. It is unnecessary here to show or describe the remaining details of the ignition system, since such systems are well known to those skilled in the art, it being understood, of course, that suitable provision may be made to cause the firing of the charges of combustible mixture in the cylinders in the proper order.

*Fuel supply system.*

Any usual or desired means may be provided to supply a combustible mixture to the engine, but in the present example I have shown a fuel system which is peculiarly adapted to the present type of engine. Referring to Figs. 20 and 22, I have there shown a fuel pump 61, having an inlet passage 62, which may be connected by a suitable pipe 63 to a suitable source of supply of hydro-carbon, and a main supply tank (not shown). The inlet passage 62 leads into a cylinder 64, to which the hydro-carbon is admitted under the control of a check-valve 65, which prevents the flow of the fuel in the reverse direction. Working in the cylinder 64 is a piston 66, whose movement in an upward direction causes an inflow of fuel into the cylinder, and whose downward movement causes an outflow through an outlet passage 67. A suitable check valve 68, shown in Fig. 22, prevents the flow of the fuel in the reverse direction. As a means for taking care of any fuel which might otherwise leak past the piston 66, I have herein provided the latter with an annular groove 69, cooperating with a port 70 and return passage 71 (shown in Fig. 20), constituting a by-pass leading back to the inlet passage of the pump. In practice, the level of the fuel in the main supply inlet should always be below the upper end of the cylinder 64, thereby to avoid any danger of fuel finding its way into the crank-case 45.

The piston 66 may be operated by any suitable means, but in the present example, I have shown the same carried by a cross-head 72, the latter cooperating with an eccentric or cam 73, against which the cross-head is urged by a spring 74. The eccentric or cam 73 may be driven by the crankshaft 47 through any suitable mechanism. In the present example, I have shown the cam or eccentric formed on or secured to a shaft 75, to which is also secured a worm gear 76, the latter meshing with a worm 77, which is formed on or secured to a shaft 78.

Referring now to Fig. 3, the shaft 78 has secured to it a sprocket wheel 79 connected by an appropriate chain 80 to a sprocket wheel 81, the latter being secured to the crankshaft 47. As a means for adjusting the tension of the chain 80, thereby to prevent any undue slack and backlash, I have herein provided an idle sprocket wheel 82 mounted on a sliding plate 83, the latter having a threaded stem 84, which may be adjusted by a nut 85 in an obvious manner.

The ratio of the gearing and the capacity of the pump is such that the latter is capable of furnishing a supply of fuel in excess of the requirements of the engine, while the surplus may be carried back to the main fuel supply tank by appropriate means, such as that hereinafter described.

As a means for maintaining a reserve supply of fuel, and to supply the latter to the carbureter under uniform pressure, I have herein provided an auxiliary fuel supply tank 86, best shown in Fig. 23, receiving its supply from the hereinbefore described fuel pump 61 through a pipe 87, best shown in Fig. 3. When the engine is in operation, the fuel pump 61 discharges through the pipe 87 into the auxiliary tank 86 a supply of liquid fuel in excess of the requirements of the engine. The surplus fuel may be returned to the main fuel tank by any appropriate means, but in the present example, I have shown an overflow pipe 88 open at its upper end and communicating at its lower end with a return pipe 89 leading to the main fuel tank, the communication being under the control of suitable means, herein a needle valve 90, having its stem mounted to slide in upper and lower guides 91 and 92. In the present example, the needle valve is under the control of a float 93, secured to the valve-stem at the proper height to maintain within the auxiliary tank 86 a supply of the liquid fuel, whose level is substantially at the open upper end of the overflow pipe 88. As soon as there is any tendency to exceed this level, the float 93 lifts, unseats the valve 90, and allows the overflowing fuel to pass through the return pipe 89 to the main fuel tank.

Any suitable carbureter may be employed, but I have herein shown a carbureter 94, best seen in Fig. 23, receiving its supply of liquid fuel from the auxiliary fuel tank 86 through a pipe 95, which delivers the same to a usual float chamber 96 to which the fuel is admitted under the control of a usual needle valve 97, controlled by a usual float 98. The float and float control needle valve operate in a usual and well-known manner to maintain in the float chamber a supply of the liquid fuel at an appropriate level which, in practice, is at about the height of the fuel atomizing nozzle. As a means for equalizing the pressures in the auxiliary fuel tank 86, and the carbureter float chamber 96, I have herein provided a pressure equalizing pipe 99 connecting said chambers with each other above the fuel levels in the respective chambers.

Leading from the float chamber 96 is an outlet passage 100, herein extending horizontally therefrom and communicating with a vertical passage 101, to which the fuel is admitted under the control of a suitable valve 102, which I shall call a metering pin or fuel valve, the latter being mounted to slide vertically with relation to a valve seat, or restricted opening 103 leading to the passage 101. In the present example, the metering pin 102 extends in a downward direction to the exterior of the carbureter, and may be provided with a stuffing box or gland 104, having suitable packing 105.

The passage 101 may deliver the liquid fuel to any appropriate fuel-atomizing device, but in the present example, I have shown the same communicating with an annular passage 106, the latter in turn delivering the liquid fuel through one or more, herein a plurality of, orifices 107 to the throat of a Venturi tube 108. Leading from the latter, above the orifices 107, is a speed-compensating passage 109, which communicates by way of a passage 110 with the upper portion of the carbureter float chamber 96, and also communicates, by way of a passage 111 with the hereinbefore described passage 101. The communication by way of the passage 111 is herein controlled by an adjustable valve 112, which may be of any suitable type and mounted for adjustment in any appropriate manner to admit air to the jet to compensate for variations in speed throughout the speed-range at any given load on the engine. In the present example, I have employed for this purpose a needle valve whose stem is secured to a threaded shank 113 having a head 114 at the exterior of the carbureter. Beneath the head, I may place one or more washers 115 of the proper thickness to preserve the proper adjustment of the valve when once it has been determined by experiment.

As a means to regulate the effective area of the orifices 107, and to admit the principal supply of air to the Venturi tube 108, I have herein provided a tubular valve 116, best shown in Fig. 23, coaxially disposed with relation to the Venturi tube and suitably mounted for axial adjustment. To this end, I have herein provided said tube with a stem 117 having a screw-threaded engagement with the carbureter casing and extending to the exterior thereof where it may be provided with appropriate means, herein a slot 118, to receive a screw-driver whereby it may be turned to adjust the same in a vertical direction. A nut 119 threaded onto the stem 117 serves as a means to lock said stem in the desired position of adjustment. If desired, a washer 120 may be interposed between the nut 119 and the carbureter casing to prevent leakage around the stem 117.

It should here be explained that the air which is utilized in the formation of the combustible mixture is not drawn into the fuel system by the suction of the pistons but is forced in and afterwards carbureted while under comparatively high pressure, as will hereinafter appear. Hence, special provision must be made for properly atomizing, vaporizing and proportioning the liquid fuel, which would not be required in other types of engines where the fuel is mixed with the air at or below atmospheric pressure. In the normal operation of the engine, the auxiliary fuel tank, the carbureter and the vaporizer hereinafter described, are under a comparatively high pressure which is variable under different speeds and loads. The carbureter must be provided with means to supply a proper amount of fuel when the engine is operating at the same speed under different loads, and also means to compensate for different speeds under the same load. The carbureter 94 herein shown is of the type that mixes a small amount of air with the liquid fuel in the fuel passage before the fuel reaches the discharge orifices and meets the air passing through the throat of the Venturi tube of the carbureter.

The carbureter is herein provided with an air intake passage 121 which may be and is herein subdivided by a wall 122 to form passages 123 and 124. The passage 123 communicates with an annular space 125 surrounding the tubular valve 116 within the Venturi tube 108, while the passage 124 communicates with the interior of the tubular valve 116, the latter to this end being provided with one or more, herein two, ports 126. The passage 123 is constantly open while the passage 124 is herein controlled by a throttle valve 127. When the latter is closed, as it appears in Fig. 23, air is supplied through the passage 123 only and this air, rushing through the annular space 125 past the orifices 107, furnishes a combustible mixture to the engine when the latter is idling, as well as at all other times. When the throttle valve 127 is opened, however, the main supply of air which it controls passes through the passage 124, ports 126 and interior of the tubular valve 116 to the throat of the Venturi tube 108 where it rushes past the orifices 107 and atomizes the liquid fuel.

The throttle valve 127 may be of any suitable type, but I have herein shown a balanced valve so constructed and arranged that the pressure is always equal on opposite sides of the axis in any position of the valve, and hence does not interfere with its free operation. Referring to Fig. 25, the valve herein shown is cylindrical in form and is provided with two ports 128 which are preferably semicircular in cross-section, thus providing a very gradually increasing area of opening, especially when the valve is in a nearly closed position. This is a very desirable feature since it permits the valve to be moved one way or the other when adjusting its limiting stops, hereinafter described, to obtain the proper opening of the fuel valve for slow running or idling of the engine. The throttle valve is herein provided with stems 129 and 130 extending through the carbureter casing to the exterior of the latter. As a means to prevent any leakage about these stems, I have herein provided stuffing boxes 131 and 132 having packing rings 133 and 134, and glands 135 and 136 by means of which the packing rings may be compressed to insure non-leaking joints.

As a means for properly proportioning the supplies of air and liquid fuel at all positions of the throttle valve 127, I have herein provided means connecting the throttle valve with the hereinbefore described metering pin or fuel valve 102, whereby the action of the throttle valve and metering pin may be coordinated. To this end, I may provide any suitable connections including a cam 137, best shown in Fig. 24, secured to the stem 129 of the throttle valve 127 and cooperating with a cam-wiper, herein bell-crank lever 138, pivoted at 139 and having a slot 140 in which is located a pin 141 carried by the metering pin 102. A suitable spring 142 constantly tends to maintain the bell-crank lever in engagement with the cam as shown in Fig. 24. When, however, the throttle valve is turned to vary the throttle opening, the position of the metering pin may be correspondingly varied, the relative movement being, of course, determined by the shape of the cam. Herein, the latter is so formed that opening movement of the throttle valve is accompanied by an opening movement of the metering pin, and closing of the throttle valve is accompanied by closing movement of the metering pin.

It is evident that, for starting purposes, an exceptionally rich mixture must be provided, and to this end I have made suitable provision for operating the metering pin independently of the throttle valve. To this end, I have herein provided a plunger 143, best shown in Fig. 24, mounted to slide in a suitable guide 144, and normally out of engagement with the bell-crank lever 138, but adapted to be moved into engagement therewith whereby the said lever may be moved away from the cam 137, and the metering pin 102 lowered independently of the throttle valve, thereby to give an increased supply of liquid fuel temporarily. The plunger 143 may be normally held out of engagement with the bell-crank lever 138 by any suitable means, herein a spring 145 encircling said plunger and bearing at one end against the guide 144, and at its other end against an abutment 146 in the form of a collar secured to said plunger. In practice, the latter will be extended to some convenient point, which in the case of a motor vehicle may be the dash-board or cowl.

Any suitable means may be provided for limiting the opening and closing movements of the throttle valve 127, but in the present example, I have provided limiting means, best shown in Fig. 26, comprising two adjustable stop screws 147 and 148 cooperating with an arm 149 secured to the throttle valve stem 130. Herein, the stop screws 147 and 148 are threaded into ears 150 and 151, and are provided with lock nuts 152 and 153, whereby they may be secured in the desired position of adjustment.

Any usual or desired throttle-valve operating means may be provided, but in the present example, I have shown a link 154, best seen in Fig. 23, connected at one end to the arm 149 and at its other end to an accelerator pedal 155. The latter, as is customary, is provided with a suitable spring 156, which elevates the same and carries the throttle valve to its normal closed position. Depression of the accelerator pedal in opposition to the spring opens the throttle valve. When the pressure of the foot is removed, the spring 156 asserts itself and again closes the throttle valve.

In order to increase the efficiency of the engine and to enable it to use economically the low grade of fuel now on the market, I may provide any suitable atomizer and vaporizer, such for example as the vaporizer 157 best shown in Figs. 27 to 31, inclusive, the same having an inlet 158 which, as best shown in Fig. 23, receives the atomized fuel and air from the Venturi tube 108 through a conduit 159. The upper portion of the atomizer and vaporizer 157 is herein provided with a chamber which is divided by an annular wall 160 into two concentrically arranged chambers 161 and 162. This wall may be conveniently formed as a depending flange on a removable cover plate 163, which closes the top of the atomizer and vaporizer. The annular wall 160 may be provided with one or more, herein a plurality of openings 164 affording communication between the chambers 161 and 162, as best shown in Figs. 27 and 28. Preferably the inlet 158 for the atomized fuel and air delivers the same tangentially into the chamber 161, and by this means the action of centrifugal force is utilized to carry the heavier particles to the outer wall of the chamber, while the lighter particles pass through the openings 164 into the chamber 162.

The mixture delivered into the outer annular chamber 161 preferably escapes therefrom through a Venturi passage 165 which may be and is herein annular and is formed by an annular plate 166 and an annular flange 167, the latter herein depending from the annular partition 160, as best shown in Figs. 27 and 28. A second Venturi passage 168, preferably adjacent the first, is herein formed by the flange 167 and another flange 169, the latter being formed on a sleeve 170 depending from the cover plate 163. The heavier particles of fuel, mixed with air, rush from the outer annular chamber 161 through the annular Venturi passage 165 at high velocity and in a thin stream, which meets a corresponding stream of the lighter particles and air, which passes from the inner chamber 162 through the Venturi passage 168. The combined streams are thus thoroughly mixed and atomized, or in other words, the particles of fuel become very finely divided and the combined stream is delivered into a central chamber 171, which delivers the same in a downward direction into a vaporizing chamber 173. At this point, the mixture may be subjected to the action of heat to vaporize the same, and to this end is caused to impinge upon a heated wall 174, which may be termed a "hot spot." This wall may be heated in any appropriate manner, as by means of the exhaust gases of the engine which may be caused to impinge on the opposite surface of the wall, as will appear hereinafter.

In order to compel the mixture to travel along the heated surface of the wall 174, I have herein provided a baffle-plate 175, best shown in Fig. 31, separated from the casing of the vaporizer by one or more, herein two, narrow passages 176 through which the mixture may be compelled to flow as indicated by the arrows at the right and left-hand sides of Fig. 27. When the mixture takes this course, it is compelled to traverse practically the entire area of the heated wall 174, and is thus subjected to a very thorough heating action. It is desirable, however, to vary the heating action in accordance with the requirements of the engine, and to this end I may provide the baffle-plate 175 with one or more, herein a plurality of, openings 177, best shown in Fig. 31, which may be opened to a greater or less extent, according to the requirements, by appropriate means, herein a rotatable valve 178 (see Fig. 27), the latter being provided with a plurality of openings 179, best shown in Fig. 31, which may be brought into more or less complete registration with the openings 177 by turning said valve about its axis. To this end, the valve is herein secured to a valve stem 180, best shown in Figs. 27 and 28, having at its lower end a bearing 181 in the wall 174, and having its upper end guided in the sleeve 170. As a means to prevent leakage about the stem 180, where the latter is extended to the exterior of the vaporizer, I may provide a stuffing box 182, having a packing ring 183 encircling the valve stem.

When the several openings 177 are in complete registration with the respective openings 179, the combustible mixture can then take a shorter and more direct course out of the vaporizing chamber 173, and hence is not compelled to traverse the entire surface of the heated wall 174. The action can, of course, be varied by regulating the size of the apertures afforded by the openings 177 and 179, which can be overlapped to a greater or less extent, as the circumstances may require. As a means for varying this action, I may provide suitable connections between the valve stem 180 and the accelerator pedal 155, so that an increase in the opening of the throttle 127 (see Fig. 23) may be accompanied by an increased area of the apertures 177 and 179 and vice versa. To this end, I have herein provided suitable connections, including an arm 184 secured to the valve stem 180 and connected by a link 185 to an arm 186, the latter being secured to a rock-shaft 187, to which the accelerator pedal 155 is also secured, as best shown in Fig. 23. Thus it is evident that the operations of the throttle valve 127 and the valve 178 are coordinated, and most effective heating action is secured for all positions of the throttle valve and all engine speeds and loads. The comminuted and thoroughly heated combustible mixture is then delivered into a chamber 188, best shown in Fig. 28, whence it is delivered through an outlet passage 189 leading to the engine.

As a means to distribute the combustible mixture to the several cylinders 53, I have herein provided an intake system which is in the form of a species of manifold having a main intake passage 190, best shown in Fig. 4, leading from the outlet passage 189 of the vaporizer, and preferably extending through the cylinder casting 54 between the second and third cylinders. At one side of the cylinders 53, and preferably integral with the cylinder casting 54, is a valve casing 191, preferably provided with a water-jacket 192, having a water-space 193 forming a part of the cooling system hereinbefore mentioned. The valve casing is herein provided with an inlet port 194, best shown in Fig. 6, to which combustible mixture is constantly supplied through the main intake passage 190. The valve casing is also provided with a plurality of outlet ports 195, best shown in Fig. 9, corresponding to and communicating with the cylinders 53. The combustible mixture, passing through the inlet port 194, is subdivided and distributed to the outlet ports 195 leading to the respective cylinders under the control of suitable means, herein a cylindrical sleeve valve 196, and a concentrically-arranged core 197. The valve may be, and is herein mounted to rotate, and is provided with a plurality of ports 198 (see Fig. 6), arranged in some suitable manner, as for example in staggered relation with one another, so that during the rotation of the valve, the port 194 in the valve casing is continuously in communication with a port 199 in the core 197 (see Fig. 6).

The port 199 leads into a primary inlet chamber 200, within the core 197, and this chamber in turn communicates through two ports 201 (see Fig. 6), with two secondary inlet chambers 202, from each of which two ports (four in all) lead (see Fig. 6) into registration with the ports 195 leading to the respective cylinders 53, as best shown in Fig. 5. It must now be evident that, by providing suitable ports in the sleeve valve 196, rotation of the latter will cause the distribution of the combustible mixture to the several cylinders in the proper order. To this end, the valve (see Fig. 11) is provided with a plurality of ports 204, two for each cylinder, in alignment with and preferably of the same size and shape as the ports 195 and 203. Thus it is evident that, with each rotation of the sleeve valve, two charges of combustible mixture are delivered to each of the cylinder ports 195.

Any suitable mechanism may be provided for driving the sleeve valve 196, but in the present example, I have shown the latter provided with a plurality of clutch teeth 205, best shown in Fig. 11, interengaging with similar clutch teeth 206 on a rotatable sleeve 207, the latter, as best shown in Fig. 9, having keyed to it an appropriate driving member 208, herein comprising two parts 209 and 210, which may be, and are herein relatively adjustable circumferentially, in order to provide for an adjustment of the timing of the valve. To this end, the part 210, as best shown in Fig. 3, is provided with one or more, herein a plurality of segmental slots 211, to receive clamping bolts 212, which extend through the parts 209 and 210, as best shown in Fig. 9.

In the present example, the driving member 208 is in the form of a sprocket wheel connected by a suitable chain 213 to the hereinbefore described sprocket wheel 79. As a means for adjusting the tension of this chain, I may provide an idle sprocket wheel 214 mounted on a sliding plate 215, the latter having a threaded stem 216, which may be adjusted by a nut 217 in an obvious manner. Since the engine herein shown is of the two-cycle type, the ratio of the gearing connecting the valve 196 to the crankshaft 47 is such that the valve is driven at one-half crankshaft speed.

Any suitable housing may be provided for the described gearing, but in the present example I have shown a gear casing 218, which may comprise two parts 219 and 220, best shown in Fig. 9, secured to each other by bolts or studs 221. The part 219 may be suitably secured to the valve casing 191, the latter to this end being herein provided with a flange 222 to receive a plurality of studs or bolts 223.

*Scavenging and air supply system.*

Any suitable means may be provided to scavenge the cylinders of the burnt gases, and to supply to the cylinders the air necessary to form the combustible mixture, but I have herein shown means for utilizing the energy of the exhaust gases for this purpose. Each of the cylinders 53 is provided with a plurality of exhaust ports 224, best shown in Fig. 7, preferably separated from each other by bridges 225, and arranged to deliver the exhaust gases through an exhaust passage 226 into one or more appropriate exhaust manifolds. In the present example, I have shown two exhaust manifolds 227 (see Fig. 2), one receiving the exhaust gases from the first and second cylinders, and the other from the third and fourth. It should here be noted by reference to Figs. 27 to 31, inclusive, that one of the exhaust manifolds, herein the one which receives the exhaust gases from the first and second cylinders, is utilized to furnish the heat for heating the wall 174 of the vaporizing chamber 173; and that the atomizer and vaporizer 157 is superimposed upon such exhaust manifold, and is suitably secured thereto as by means of studs 228. Thus the heated wall 174, which is herein integral with the exhaust manifold, constitutes in effect a part of the atomizer and vaporizer.

By employing two exhaust manifolds, each may be utilized to reduce the pressure in the other. To this end, I have herein provided an injector 229 (see Fig. 15), which for convenience may be termed a primary injector, the latter being provided with two passages 230, delivering the exhaust gases through the ports 231, best shown in Fig. 18, into a nozzle 232. Naturally, each of the two converging passages tends to cause an ejecting action, and to reduce the pressure in the other manifold. The stream of exhaust gases passing through the nozzle 232 may be utilized to inject a supply of atmospheric air to be added to such stream. To this end, I have provided at the base of the nozzle 232 an annular air intake port 233, surrounded by an annular chamber 234, best shown in Fig. 19, which may receive its supply of air in any suitable manner, as by means of an air intake pipe 235, best shown in Fig. 15, having an inlet orifice 236. Preferably, the air intake pipe is made of some appropriate material for deadening the sound of the air rushing into the same, and I may employ for this purpose a non-resonant material such as aluminum.

Thus it is evident that the described primary injector draws in a supply of air which is discharged into the throat of a Venturi tube 237 (see Fig. 15), which delivers the combined stream of exhaust gas and air into an injector 238, which for convenience may be termed a secondary injector. The latter, in the present example, comprises three nozzles 239, 240 and 241, which may be termed the inner, outer, and intermediate nozzles, respectively, the said nozzles providing an inner passage 242, an outer passage 243, and an intermediate passage 244. The intermediate passage 244 receives its supply from the Venturi tube 237, while the inner and outer passages 242 and 243 may receive atmospheric air in any suitable manner, as by providing an air intake header 245, and a communicating air intake pipe 246, the latter having an inlet orifice 247. Preferably, the two inlet orifices 236 and 247 are disposed adjacent and opposed to each other, as shown in Fig. 15, and separated by a narrow annular space 248 for the entrance of the air. Preferably, the inlet pipe 246 is formed of suitable non-resonant material like the pipe 235.

In order to adjust the inner nozzle 239 to secure the best possible effect, the same may be threaded into the intermediate nozzle 241 for axial adjustment. It is desirable that when this adjustment has been properly ascertained by experiment, it shall remain undisturbed. To this end, I may provide one or more washers 249 interposed between the rear end of the intermediate nozzle 241, and a shoulder 250 at the rear end of the inner nozzle 239. When this adjustment has once been determined, and the proper thickness of the washer or washers 249 ascertained, change in thickness of the washer or washers may be prevented by providing a pin 251 attached to the header 245, and resting against the rear end of the nozzle 239. The header is herein attached to the injector 238 by screws 252, which cannot be introduced if any change has been made in the adjustment of the nozzle.

It should now be evident that the stream delivered by the Venturi tube 237 into the secondary injector 238 causes the latter to draw in a large supply of air, and to deliver the same into the throat of a second Venturi tube 253, whence it passes into a return bent elbow 254, the latter having two outlets 255 and 256, one of which leads back to the engine by way of a pipe 257, while the other communicates, by way of a passage 258 and a pipe 259, with any usual or desired muffler 260. In order to control the amount of air and gas which is compelled to flow through the pipe 257 to the engine, I may provide any suitable means to close to a greater or lesser extent the passage 258, and to this end have herein provided a controlling valve 261, best shown in Fig. 15, having a stem 262, to which is secured an arm 263. As a means for coordinating the control of this valve with the throttle valve hereinbefore described, I have herein provided a link 264, best shown in Fig. 2, connecting the arm 263 with an arm 265 secured to the rock-shaft 187 of the accelerator pedal 155, the arrangement being such that when the throttle valve is closed, the controlling valve is closed, or practically so, and when one is opened, the other is correspondingly opened.

When the throttle valve 127, shown in Fig. 23, is opened to its fullest extent, and the engine is operating under full load, the valve 261 is opened to a predetermined extent, while, on the other hand, when the throttle valve is partially closed, and the engine is operating under a light load or idling, the valve 261 will be closed more or less to force a larger proportion of the mixture of air and gases supplied by the injectors to pass through the pipe 257 to the engine. The extent to which the opening of the valve 261 is varied between full load and no load, and the relative area of the opening provided with relation to the area of the pipe 257 are experimentally determined, and the lengths of the levers 263, 265, 155 and 149, are made such as to give the proper amount of travel and opening of the valve 261 with relation to the throttle valve 127.

The supply of air and gases delivered through the pipe 257 to the engine may be utilized in any appropriate manner to expel the exhaust gases from the cylinders, to supply air to the carbureter and to supply additional air to the mixture in the cylinders. In the present example, I have provided means to divide the stream of air and gases into two streams, one of which is used for scavenging purposes, and the other to supply air to the cylinders, after which, and during the compression stroke of the piston, a small portion of the mixture in the cylinder is taken therefrom and conducted to the carbureter, where it is enriched by the addition of atomized hydro-carbon.

As a means to separate the stream of air and gases into two streams, I have herein provided (see Fig. 23) a connection, or fitting, 266 having two branches 267 and 268. The branch 267, in the present instance, discharges into a chamber 269, which, for convenience may be called the scavenging air chamber, the latter herein being formed in the cylinder casting 54, and having ports 270, best shown in Fig. 6, leading into the respective cylinders 53, as best shown in Fig. 7. These ports may be, and are herein, of large area, and subdivided by one or more bridges 271 (see Fig. 7). As a means for maintaining a reserve supply of scavenging air, I have herein provided a storage chamber 272 (see Figs. 4 and 7), between the second and third cylinders, and communicating with and constituting an enlargement of the chamber 269. The admission of scavenging air to the cylinders 53 may be controlled by any appropriate means, such for example as the pistons 52, the ports 270 to this end being located at suitable points in the travels of the respective pistons, so that the latter, when nearing the ends of their power strokes, uncover said ports and admit the scavenging air to the cylinders. Preferably, the pistons 52 are provided with baffles 273 (see Fig. 5) to cause the scavenging air entering the cylinders to be deflected upwardly, thereby to direct the air to the upper ends of the cylinders, and to expel the exhaust gases as thoroughly as possible, through the exhaust ports 224, which, it will be noted, are nearly in line with the scavenging air ports 270.

The other branch 268 (see Fig. 23) herein communicates with an air passage 274, best shown in Figs. 6 and 8, formed within the core 197, and having ports 275, best shown in Fig. 6, registering with corresponding ports 276, formed in the cylinder casting 54, and leading into the respective cylinders 53, as best shown in Fig. 8. The communication between the ports 275 and 276 may be controlled by suitable means, herein the sleeve valve 196, hereinbefore described. The latter, it will be remembered, is provided with ports 204, best shown in Fig. 11, two for each cylinder. When, in the rotation of the valve, one of these ports comes into registration with the ports 275 and 276, communication is established between the air passage 274 (see Fig. 8) and the proper cylinder 53, it being understood, of course, that at such a time, the piston 52 is in proper position to uncover the port 276, as hereinafter more fully described. When this occurs, a charge of air is delivered into the cylinder just before the port 276 is covered by the piston 52 during the compression stroke of the latter. Subsequently, during the compression stroke, the charge of gas is delivered through the port 195 into the cylinder, as hereinbefore described, and this charge, mixing with the previously admitted charge of air, is compressed by the piston during the remainder of its compression stroke.

The degree of compression may be varied within suitable limits, by the provision of appropriate pressure-regulating means for regulating the amount of air supplied by way of the branch 268, (see Fig. 23), passage 274, and the ports 275, 204, and 276 (see Fig. 8). To this end, I have herein provided a regulating valve 277, best shown in Fig. 23, which is under the control of an automatic compression pressure regulator 278. The latter may be of any suitable construction, but in the form herein shown comprises a piston 279 working in a cylinder 280, the latter being herein mounted on a support 281, forming a part of the branched connection 266, as best shown in Fig. 23. The cylinder 280 may be connected by any appropriate means to the source of compressed air and the connections leading to the intake passage 121 of the carbureter 94. In the present example, the carbureter receives its supply through a supply pipe 282, best shown in Fig. 23, while the latter is connected by a pipe 283 to the cylinder 280, the communication being herein controlled by a suitable check-valve 284, herein a ball under the pressure of a spring 285. By this means, air is admitted through a port 286 into the cylinder 280, but is prevented from returning into the pipe 283. Thus it is evident that the air admitted to the cylinder 280 will build up a pressure therein, thereby tending to lift the piston 279 more or less according to the degree of pressure. As a means to prevent the building up of too great a pressure, I may employ a suitable vent 287, herein a bleed-opening of small area leading from the cylinder 280. If desired, this vent may discharge into the branched connection 266, as shown in Fig. 23.

The piston 279 may be connected to the compression regulating valve 277 in any suitable manner. In the present example, I have shown for this purpose a lever 288 connected on the one hand to the piston 279 by a rod 289, and on the other hand to the valve 277 by a rod or link 290, which, in turn, is connected to an arm 291, the latter being secured to the stem 292 of the valve. The latter is normally open, as shown in Fig. 23, and the piston 279 is normally at the bottom of the cylinder 280, but as pressure builds up in the latter, the piston rises and communicates its motion to the compression controlling valve 277, thereby closing the latter.

The lifting movement of the piston 279 is herein resisted by a spring 293, which may be otherwise suitably arranged, but in the present example is connected at one end to the longer arm of the lever 288, and at its other end to an arm 294, the latter being secured to the rockshaft 187 of the accelerator pedal 155. The tension of the spring 293 is less than that of the hereinbefore described spring 156, which, it will be remembered, tends to resist depression of the accelerator pedal 155. It follows that the spring 293 is maintained constantly under tension, and hence always tends to resist upward movement of the piston 279. When, however, the operator depresses the accelerator pedal 155 to open the throttle valve 127, the consequent downward movement of the arm 294 diminishes the tension on the spring 293, and allows the piston 279 to rise still farther and to communicate its motion to the compression controlling valve 277, thereby closing the latter to a greater or lesser extent, depending upon the extent to which the accelerator pedal has been depressed.

When the engine is operating with the valve 277 closed, part of the air which has been supplied to the cylinder through the port 270 (see Fig. 5) tends to escape through the exhaust port 224, after the port 270 has been covered by the piston on its compression stroke. Hence, part of the air in the cylinder can pass through the ports 276, 204 and 275, into the passage 274, since at this moment the ports 275 and 276 are placed in communication by the rotating sleeve valve 196. This escape of air into the chamber 274 can continue until the port 276 is covered by the piston during its up-stroke, at which point, the effective compression stroke of the piston begins. The air thus delivered into the chamber 274 can pass through the port 276 and into the cylinder that is next in succession in the firing order, and thence out through the exhaust port of the last-mentioned cylinder.

When, however, the engine is operating with the valve 277 open, air is supplied through the port 276 to the cylinder faster than it can escape through the exhaust port 224, after the port 270 is covered by the piston on the up-stroke of the latter, since the exhaust port at this moment is nearly closed, while the port 276 is wide open. If the air is supplied under sufficient pressure, it can continue to enter the cylinder, until the port 276 is covered by the piston, when the effective compression stroke of the latter commences. Thus there is a larger amount of air retained in the cylinder and compressed by the piston when the engine is operating with the valve 277 open, and hence the compression pressure in the clearance space of the cylinder is increased above that which obtains when the engine is operating with the valve 277 closed. This is because the actual amount of air compressed by the piston when the valve 277 is open is determined by the pressure of the air supplied to the cylinder.

It has been stated that, during the compression stroke of the piston, a portion of the mixture in the cylinder is taken therefrom and conducted to the carbureter, where it is enriched by the addition of atomized hydro-carbon. To this end, I have herein provided, at a suitable point above the admission port 195 (see Fig. 5), a transfer port 295, which, as best shown in Fig. 10, registers with a corresponding port 296, leading into a chamber 297, formed in the core 197, it being understood, of course, that there is one set of these ports for each cylinder. When, during the rotation of the sleeve valve 196, one of the ports 204 registers with the ports 295 and 296, communication is established between the cylinder and the chamber 297, and hence the latter receives a portion of the compressed charge from the cylinder until such communication is interrupted. The mixture is then conducted from the chamber 297, through the hereinbefore described supply pipe 282, best shown in Fig. 1, to the inlet of the carbureter 94, where it is enriched by the addition of atomized hydro-carbon. By this means, I have provided an intake system in which air is supplied to the carbureter under pressure, instead of being drawn in by the suction of the piston.

The core may be otherwise appropriately mounted, but in the present example I have shown the same secured at one end, but free at its other, so as to be capable of expanding and contracting freely lengthwise. To this end, I have herein provided the core with a flange 298, best shown in Fig. 6, secured to the valve casing 191 by studs or cap-screws 299. The other end of the core is herein provided with a reduced extension 300, best shown in Fig. 9, supported in a bearing 301, herein formed as a part of the removable cover 220 of the gear casing 218. The reduced portion 300, in turn, forms a support and bearing for the sleeve 207, which, it will be remembered, drives the valve 196.

As a means to press the valve 196 firmly against the bore of the valve casing 191 adjacent the ports 276, 195 and 295, and to prevent leakage at these points, I have herein provided the core 197 with three packing strips 302, 303 and 304, best shown in Fig. 13, extending the entire length of the core, and seated in grooves 305, 306 and 307, respectively. These strips may be pressed in an outward direction against the internal surface of the valve 196 in any appropriate manner. In the present example, I have provided beneath the strip 302 a plurality of ports 308, communicating with the chamber 297 and groove 305. I have also provided similar ports 309 and 310, leading respectively from beneath the strips 303 and 304 into the chamber 203. By this means, the pressure of the compressed mixture in these chambers is utilized to urge the packing strips against the internal surface of the valve, and to maintain the external surface of the latter in contact with the valve casing on that side which is adjacent the cylinders. As a means to prevent leakage about the port 199 (see Figs. 12 and 14), I have herein provided packing strips 311 seated in circumferential grooves 312, and a packing strip 313 seated in a longitudinal groove 314. These strips, together with the strip 302, completely surround the port 199, as best shown in Fig. 12, and thus prevent leakage about the latter.

*Oiling system.*

Any suitable oiling system may be provided to lubricate the various working parts of the engine. In the present example, I have shown a type of oiling system in which a reservoir 315, sometimes called a sump, located beneath the crank case 45 and receiving the oil drippings therefrom, supplies the oil through a suitable screen 316 to an oil-pump 317, best shown in Figs. 20 and 21. The latter herein comprises a cylinder 318, having a piston 319 working therein, and drawing oil from the sump through an intake passage 320 controlled by a check-valve 321. The oil thus drawn in by the up-stroke of the piston is discharged through an outlet passage 322, best shown in Fig. 21, having therein a check-valve 323 preventing the flow of the oil in the opposite direction. In the present example, the oil-pump is associated with the hereinbefore described fuel-pump and the piston 319 of the oil-pump is secured to and operated by the same cross-head 72 which operates the fuel-pump. If desired, a spring 324 may be utilized in association with the spring 74 of the fuel pump to compel the cross-head 72 to follow the eccentric or cam 73.

As a means for maintaining a proper pressure in the oil system, I have herein provided an oil-pressure regulator 325 (see Fig. 21), having a cylinder 326, in which a piston 327 works in opposition to a suitable spring 328, the latter being adjustable in any appropriate manner, as by means of a threaded plug 329 screwed into the upper end of the cylinder 326. The lower end of the latter is provided with a port 330, communicating with the outlet passage 322 of the oil pump 317, so that the pressure existing at this point is communicated to the piston 327 and lifts the latter in opposition to the spring 328 which, in practice, will be adjusted to cause the desired pressure in the system. When the pressure exceeds a certain predetermined point, the excess oil may be by-passed back into the crank-case by the use of one or more, herein a plurality of relief ports 330', arranged in vertical series, and adapted to be uncovered successively by the lower end of the piston 327 during the ascent of the latter.

Oil may be distributed to the various points where needed through a system of conduits, including a pipe 331, leading from the outlet of the oil pump to a bus-pipe 332, as best shown in Fig. 4, extending lengthwise of the crank-case 45. The latter is herein provided with oil-leads 333 for furnishing oil to the various bearings of the crankshaft 47, the latter being herein provided with usual holes 334 drilled to the crank-pins 49 to lubricate the latter in a well-known manner. The bus-pipe 332 may also furnish oil to the working parts at the upper portion of the engine, and to that end is herein connected by a pipe 335, best shown in Fig. 5, with an oil passage 336, best shown in Fig. 8, formed in the valve casing 191.

From this point, the oil may be distributed by suitable conduits, herein including a channel-shaped strip 337, located in a groove 338 in the core 197, as best shown in Fig. 8. This strip is provided with a channel 339 receiving its supply of oil from the passage 336 by way of a port 340 in the strip 337, and a plurality of ports 341 in the sleeve-valve 196. During the rotation of the latter, the ports 341 register successively with the port 340, and admit oil to the channel 339, whence it is distributed to the inner and outer surfaces of the valve, as well as to the driving mechanism of the latter, as will presently appear.

As a means to distribute oil to the inner and outer surfaces of the valve, I have herein provided the latter with a plurality of sets of ports 342, best shown in Fig. 11, which register successively with ports 343 in the strip 337, and thus receive oil from the longitudinal channel 339. The oil so distributed to the ports 342 in the valve 196 works along the inner and outer surfaces of the latter, and lubricates the same. The strip 337 is also provided with two sets of ports 344, which are in line with the extreme ends of the ports 204 in the valve 196, as best shown in Fig. 8. Surplus oil thus reaching the ports 204 during the rotation of the valve is prevented from reaching the cylinder ports 276, 195 and 295, by the provision of an oil drain chamber 345 having four ports 346 (best shown in Fig. 5), in line with the ports 204, so that the latter, when registering therewith, deliver the surplus oil to said chamber. The latter is herein connected by a pipe 347, best shown in Fig. 4, to the crank-case 45, so that the surplus oil will drain thereinto. In order to reduce the pressure of the mixture trapped in the ports 204 of the valve 196 before said ports come into registration with the ports 346, I have herein provided a port 348 (see Fig. 5) leading from a point above the ports 346 to the chamber 274, thus avoiding a heavy back-pressure against the oil in the channel 339.

Referring now to Figs. 8 and 9, as a means for lubricating the sleeve 207, shown in Fig. 9, I have herein provided the core 197 with a groove 349, leading from the groove 338 (at the right-hand side of Fig. 8), and extending along the reduced extension 300 of the core. This groove conducts oil to the internal surface of the rotating sleeve 207, thus lubricating the cooperating bearing surfaces of said sleeve, and the reduced extension 300. The sleeve may be provided with one or more, herein a plurality of oil holes 350, shown in Fig. 9, to feed the oil in an outward direction to the co-operating bearing surfaces of the sleeve, and the gear casing part 219. As a means for furnishing oil to the gearing within the gear case 218, I have herein provided oil holes 351 extending through the sleeve 207 and through the hub of the sprocket wheel 208. During the rotation of the sleeve, the oil holes 350 and 351 take oil from the groove 349 and deliver the same to the desired points.

Referring now to Figs. 5 and 5ª, as a means to prevent an excess of oil reaching the walls of the cylinder 53 above the lower sides of the ports 224 and 270, I have herein provided the piston 52 with a scraper-ring 352, best shown in Fig. 5ª, located in a groove 353, the latter herein communicating with the interior of the crank-case 45 by passages 354 and 355, a circumferential groove 356, and a series of ports 357 leading from the latter to the interior of the piston. The passage 354 is connected by a passage 358 to a longitudinal groove 359 in the piston, so that when the latter is in the proper position to cause communication to be established between the port 270 and the groove 359, during either the power or compression stroke of the piston, the air pressure existing in the chamber 269 will cause the oil to be expelled through the passages 358, 354, 355, groove 356, and ports 357, into the crank-case 45.

General operation.

The direction of rotation of the crank-shaft is contra-clockwise, as shown by the arrows in Figs. 32 to 41, inclusive. Let it be assumed that the engine has been started by some outside agency, such as any of the many well-known starting devices, and that a pressure has been built up in the air supply and storage chambers 269 and 272. Let it be assumed, also, that the piston 52 is at the upper end of its compression stroke, and that the previously admitted charge of combustible mixture is fired at the proper moment, either before, while, or after the crank is "on center", depending, of course, on the speed at which the engine is operating. Fig. 32 shows the crank "on center", and the piston at the upper end if its compression stroke, and ready to commence its downward or power stroke.

The piston, in descending, uncovers the port 295 as shown in Fig. 33, but the ports 295 and 296 are covered by the valve 196, one of whose ports 204, has just passed the ports 295 and 296, as shown in Fig. 32. Continuing its descent, the piston uncovers the port 195, as shown in Fig. 34, but the ports 195 and 203 are also covered by the valve 196. Still descending, the piston next uncovers the port 276, as shown in Fig. 35, but the ports 276 and 275 are at this time covered by the valve 196. Near the end of its power stroke, the piston uncovers the exhaust port 224, as shown in Fig. 36, thus releasing the burnt gases into the exhaust manifold 227, whence they pass to the injectors and furnish the energy to force air into the air supply and storage chambers 269 and 272.

Finally, the piston uncovers the port 270, as shown in Fig. 37, and, in so doing, places the cylinder 53 in communication with the air supply and storage chambers 269 and 272. By this time, the pressure of the gases in the cylinder has become sufficiently reduced so that the mixture of air and cool gas supplied by the chambers 269 and 272 enters through the port 270 into the cylinder. The baffle 273 deflects the entering air and gas toward the top of the cylinder, thereby expelling the spent gases through the exhaust port 224. The piston is now at the end of its power stroke, and commences its upward or compression stroke.

When the engine is operating with the air-regulating valve 277 closed, as shown in Fig. 23, part of the air which has been supplied through the port 270 tends to escape through the exhaust port 224, after the port 270 has been covered by the piston on the compression stroke. Part of the air can pass through the ports 276 and 275 into the chamber 274, since at this time these ports are placed in communication by one of the valve ports 204 registering therewith. The air so taken into the chamber 274 passes into the cylinder which is next in succession in the firing order, and then out through the exhaust port of such cylinder. This escape of air from the first-mentioned cylinder continues until the port 276 is covered by the piston, as shown in Fig. 38, at which point the effective compression stroke begins.

When, on the other hand, the engine is operating with the air regulating valve 277 open, air is supplied through the port 276 to the cylinder faster than it can escape from the cylinder through the exhaust port 224 after the port 270 has been covered by the piston. This is because the exhaust port is nearly closed at this time, while the port 276 is wide open and is receiving a full supply of air and cool gas from the chamber 274. It must be evident that if the air is supplied under sufficient pressure it can continue to enter the cylinder until the port 276 is covered by the piston. Thus, when the valve 277 is open, there is a larger amount of air retained in the cylinder and compressed by the piston than there is when the valve 277 is closed. Hence the compression pressure is increased by opening the valve 277 and diminished by closing said valve. Of course, the actual amount of air compressed by the piston when the valve 277 is open will be determined by the pressure of the air supplied to the cylinder before the effective compression stroke commences.

It should now be evident that, owing to the inertia of the exhaust gases and scavenging air, it is possible to force into the cylinder and retain therein to be compressed, a greater amount of air than would be the case, as in the ordinary type of two-stroke engine, if the scavenging air port or the transfer port, as the case may be, were covered by the piston before the exhaust port is covered. This is an important feature of my invention.

Returning now to Fig. 38, when now the piston has covered the port 276, a port 204 in the valve commences to register with the ports 195 and 203, thus placing the cylinder in communication with the chamber 202, to which, it will be remembered, combustible mixture is supplied by the carbureter. When this occurs, combustible mixture under pressure is supplied through the port 195 to the cylinder, where it is added to the air until the port 195 is closed by the piston, as in Fig. 39. Continued upward movement of the piston compresses the charge. When the piston reaches some such position as that represented in Fig. 40, one of the ports 204 in the valve 196 commences to register with the ports 295 and 296, and before the piston covers the port 295, some of the compressed mixture of air and fuel escapes into the chamber 297, as will be evident from an inspection of Fig. 41. It should be understood, of course, that even when the engine is operating at high speed and with the maximum spark advance, the timing is such that the port 295 is covered by piston.

Naturally, the maximum amount of mixture transferred to the chamber 297 is determined by the position of the throttle valve 127 (Fig. 23), and the amount of fuel added to it is proportioned to the amount of opening of the throttle valve, since the latter is interconnected with the metering pin or fuel valve 102. The latter, it will be remembered, is actuated by the cam 137 (Fig. 24), and the shape of this cam may be experimentally determined to move the valve 102 so that the proper amount of fuel will be supplied throughout the load range at any given engine speed. Suitable adjustment of the valve 113 is also made to admit air to the jet to compensate for variations in speed throughout the speed range at any given load on the engine.

The maximum amount of mixture that is transferred when the throttle valve is wide open may be very small in proportion to the piston displacement, since only an amount necessary properly to atomize the fuel is required to be taken from the cylinder to the carbureter. From an inspection of Fig. 23, it will be evident that the amount of mixture transferred when the throttle valve 127 is closed is determined by the position of the tubular valve 116, which may be adjusted vertically as described. Such adjustment will be made when the throttle valve 127 is closed and the engine idling. The construction is such that there is sufficient velocity of the mixture past the fuel jet openings to feed the fuel, even at low engine speeds and with the throttle closed.

It should be evident that this transfer of a small quantity of mixture, while at a comparatively high pressure, to a lower pressure is an important feature, since atomized fuel can be supplied to the cylinder after the exhaust port is closed, without employing a separate compression piston or other moving part operated by the engine. By this means, I am enabled to reduce the cost of the engine, while at the same time increasing its mechanical efficiency.

The compressed mixture thus transferred to the chamber 297 is conducted by the pipe 282 (see Fig. 23) to the carbureter 94, where it takes up an additional supply of fuel. The mixture, thus enriched, enters the atomizer and vaporizer 157, where it is thoroughly broken up and heated. In an internal combustion engine using a heavy hydrocarbon as fuel, and even with the low-grade gasoline now available, it is very desirable highly to atomize the liquid in order that it may be properly mixed with air, and also because, when in this condition, it can be subjected to a higher temperature and more thoroughly vaporized without danger of being "cracked", and without producing tarry deposits. As shown in Fig. 29, the mixture from the carbureter enters the chamber 161 of the atomizer tangentially, thus creating a rotary effect and utilizing centrifugal force to carry the heavier portions to the outer wall of the chamber and compel them to pass through the restricted annular opening 165 (see Fig. 27) adjacent the bottom of the chamber. The lighter portions of the fuel pass over the top of the partition 160 into the chamber 162, and then through the restricted annular opening 168, where they meet the heavier portions of the fuel emerging from the annular opening 165. The two annular openings 165 and 168 cooperate to form an injector and atomizer, which is very effective in atomizing the fuel and mixing it with the air, since the stream is very thin as compared with the stream which passes through the throat of the Venturi tube of an ordinary carbureter.

When the mixture passes down through the chamber 171 into the vaporizing chamber 173, the inertia of the heavier portion of the mixture carries it into contact with the highly heated wall 174, where it is superheated, the extent of heating depending on the nature of the fuel that is used. If the fuel is gasoline, it may be used as a saturated mixture without superheating to any great extent. In any case, the area of the space 176 between the baffle-plate 175 and the side walls of the chamber 188 and the distance of said plate from the heated wall 174 can be made to suit the fuel. The area of the heated wall 174 may be made such as to supply more or less heat to the mixture passing through the chamber 173, according to the kind of fuel used.

As previously intimated, the capacity to vary the compression pressure and to maintain a substantially constant volume, is an important feature of my invention. In an internal combustion engine operating on the constant volume cycle, the liberation of heat energy depends for its efficiency on several conditions existing prior to the ignition of the combustible mixture. With any given mixture, the maximum compression pressure is limited by the likelihood of pre-ignition. On the other hand, the thermal efficiency drops rapidly with a decrease in compression pressure. The higher the compression, other conditions being the same, the greater the thermal efficiency will be, but with a given mixture, the compression pressure must be kept below the critical point of preignition.

For starting purposes, and also to obtain a high mean effective pressure when the full power of the engine is wanted, a fairly rich mixture is required. If the mixture is weakened, the compression pressure may be increased without danger. A mixture too lean to ignite at a given pressure will ignite and do useful work is sufficiently compressed. If the compression pressure is increased while the mixture is made leaner, practically the same rapidity of combustion can be maintained. This result, I am enabled to accomplish with the described engine.

In ordinary engines of either the four or two-stroke type operating on the constant volume cycle, the maximum amount of combustible mixture supplied to the cylinder is determined by the volume of piston displacement, and the maximum compression pressure is pre-determined by the volume of the compression space above the piston with relation to the volume of the piston displacement. As a result, in the case of the four-stroke type of engine operated at a fairly high speed, the cylinders are not filled with combustible mixture at atmospheric pressure, because of the "wire-drawing" of the mixture in passing through the ports and passages. Thus the power of the engine is considerably less than would be the case if full charges were drawn into the cylinders, not only because there is a less amount of fuel burned in a given time, but also because the fuel that is burned is used less efficiently, on account of the decreased compression pressure.

In the case of the ordinary type of two-stroke engine, so much spent gas is retained in the cylinders that the compression pressure does not fall off, but the amount of combustible mixture taken into the cylinders is so much less, that the torque of the engine falls off more rapidly at high speeds than it does in the case of the four-stroke engine. This condition grows worse at high altitudes because the weight of the charges drawn into the cylinders is still less, and hence the power of the engine is decreased below its power at sea level. Obviously, this is an undesirable result in engines which are required to operate at low and high altitudes, as in the case of airplanes. In ordinary engines, the maximum compression pressure is limited by the critical pressure at sea level, and hence the power of the engine is less at high altitudes where power is most needed.

In the engine herein shown and described, the amount of air supplied to the cylinders and the degree of compression pressure are not determined directly by the piston displacement, but means are provided automatically to regulate or control the maximum compression pressure under all operating conditions. Moreover, means are also provided to increase or decrease the compression pressure inversely with relation to the amount of fuel supplied and the load on the engine, so that when a less amount of fuel is supplied to the engine under a decreasing load, the compression pressure will be increased; conversely, when a greater amount of fuel is supplied, the compression pressure will be decreased to prevent preignition. This result is secured by interconnecting the throttle with the pressure regulator, as shown in Fig. 23.

The tension of the spring 293 (Fig. 23) in practice is so adjusted that when the pedal 155 is depressed to open the throttle valve 127 to its greatest extent and to open the fuel valve 102, the pressure of the mixture supplied from the chamber 297 to the cylinder 280 of the compression pressure regulator 278 will just balance the tension of the spring 293 when the desired compression pressure in the engine cylinders is obtained. If, now, the throttle valve 127 and the fuel valve 102 are partially closed by the upward movement of the pedal, the tension of the spring 293 will be increased, and hence the air valve 277 will be opened more or less, so that air will be admitted to the cylinders through the respective ports 276 after the exhaust ports 224 are closed during the upward strokes of the pistons. Conversely, if the pedal 155 is depressed to open the throttle valve 127 and the fuel valve 102, the tension of the spring 293 will be diminished, and the pressure of the fluid under the regulator piston 279 will lift the latter, thereby closing the air-controlling valve 277 more or less. It follows that a smaller quantity of air will be supplied to the cylinders through the respective ports 276 and the compression pressure will be reduced.

It should here be remembered that the throttle valve 127 and fuel valve 102 are also interconnected with the exhaust-controlling valve 261 (see Fig. 1), so that when the throttle valve and fuel valve close, the exhaust controlling valve closes to cause an increased proportion of air to be supplied to the cylinders, as compared with the amount passing to the muffler. Although the total volume of exhaust gases discharged by the engine will be decreased because of the decreased supply of fuel to the engine, the amount of mixed air and gases supplied to the cylinders is thus increased. Of course, the velocity of the gases will be reduced, and the efficiency of the ejectors will be correspondingly reduced (that is to say, there will be a larger proportion of gases mixed with the air supplied to the cylinders); yet, in any case, there is always more air supplied than is necessary for the complete combustion of the fuel that is being supplied at such time.

By the scavenging means herein shown and described, there may be supplied to the cylinders a very large volume of scavenging air which tends to cool the latter internally. Furthermore, an overcharge of air may be introduced into the cylinders, so that the pressure therein may be above atmospheric before the commencement of the compression stroke, thereby increasing the compression pressure above the normal compression that is employed at full load. By regulating the speed of a constant volume engine in the described manner, the thermal efficiency is thereby increased when operating at less than full load above that which is obtained in an engine controlled by varying the amount of air in direct proportion to the amount of fuel supplied, as is the case in the method of regulation commonly employed.

In an engine operating on the constant volume cycle, it might be possible by manual operation to control the compression pressure so that it will vary inversely with the amount of fuel supplied, but it would be a difficult and delicate operation and not practicable. When, however, the compression pressure in the cylinders is employed automatically to control the amount of air supplied to the cylinders, the regulation is accomplished in a simple and positive manner by manually varying the adjustment of the automatic controlling means.

While I have herein shown and described one specific form or embodiment of my invention for illustrative purposes, and have disclosed and discussed in detail the construction and arrangement incidental to one specific application thereof; it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one form of my invention, what I claim and desire by Letters Patent to secure is:

1. In an internal combustion engine, the combination of a cylinder, a piston working therein, means for supplying fuel to said cylinder, and means controlled by pressure from said cylinder for increasing the compression pressure above normal while diminishing the fuel supply.

2. In an internal combustion engine, the combination of a cylinder, a piston working therein, means for supplying fuel to said cylinder, and means controlled by pressure from said cylinder automatically to regulate the maximum compression pressure in accordance with the fuel supplied.

3. In an internal combustion engine, the combination of a cylinder, a piston working therein, means for supplying fuel to said cylinder, a pressure regulator automatically to regulate the maximum compression pressure in accordance with the fuel supplied, and manually operable means for adjusting the regulating means in accordance with the fuel supplied.

4. In an internal combustion engine, the combination of a cylinder, a piston working therein, exhaust actuated means for supplying fuel to said cylinder, means for throttling said fuel, means for regulating the compression pressure, and interconnecting means between said throttling means and said regulating means.

5. In an internal combustion engine, the combination of a cylinder, a piston working therein, means for supplying fuel to said cylinder, means for throttling said fuel, means for regulating the compression pressure, and means to cause a diminution of the fuel supply to be accompanied by an increase in the compression pressure.

6. In an internal combustion engine, the combination of a cylinder, a piston working therein, means including an injector in the path of the exhaust to supply a mixture of air and fuel to said cylinder, there to be compressed by said piston, and means to cause a portion of the mixture so compressed to be taken from said cylinder and utilized to feed and atomize the fuel supplied to the cylinder.

7. In an internal combustion engine, the combination of a cylinder having a plurality of scavenging air ports, means including an exhaust actuated injector to cause scavenging air to be supplied thereto, and means to regulate the amount of air supplied to one of said ports.

8. In an internal combustion engine, the combination of a cylinder having a plurality of scavenging air ports, exhaust actuated means to cause scavenging air to be supplied thereto, and engine-operated means automatically to regulate the amount of air supplied to one of said ports.

9. In an internal combustion engine, the combination of a cylinder having a plurality of scavenging air ports, means to cause scavenging air to be supplied thereto, and means controlled by the compression pressure automatically to regulate the amount of air supplied to one of said ports.

10. In an internal combustion engine, the combination of a cylinder having a plurality of scavenging air ports, means to cause scavenging air to be supplied thereto, and means including an engine-operated valve and a pressure operated valve for controlling the admission of air to one of said ports.

11. In an internal combustion engine, the combination of a cylinder having an air admission port, means for utilizing the exhaust to supply air to said port, means for supplying fuel to said cylinder, and means to control the supply of exhaust gas and air inversely with relation to the supply of fuel to said cylinder.

12. In an internal combustion engine, the combination of a cylinder having an air admission port, means for utilizing the exhaust to supply air to said port, means for supplying fuel to said cylinder, and means to increase the amount of exhaust gas and air to said cylinder while diminishing the supply of fuel thereto.

13. In an internal combustion engine, the combination of a cylinder having an air admission port, means to divert more or less exhaust gas and to utilize the same to supply air to said port, means to supply fuel to said cylinder, and means to cause an increased diversion of gas to said port accompanying a diminished supply of fuel to said cylinder.

14. In an internal combustion engine, the combination of a cylinder, a piston working therein, means operated by the exhaust from said cylinder for compressing air and then combining fuel therewith to form a combustible mixture outside said cylinder, and means for introducing said mixture under pressure into said cylinder there to be compressed by said piston.

15. In an internal combustion engine, the combination of a cylinder, a piston working therein, and means operated by the exhaust from said cylinder for compressing air, then combining fuel therewith and introducing the complete charge of combustible mixture into said cylinder during the compression stroke of said piston and prior to the commencement of the power stroke.

16. In an internal combustion engine, the combination of a cylinder provided with a scavenging-air port and a fuel-mixture port, and means including a valve common to both of said ports to open and close said ports in succession.

17. In an internal combustion engine, the combination of a cylinder provided with an exhaust port and a scavenging-air port disposed substantially opposite and intermediate said exhaust port and the compression space, said cylinder being also provided with a fuel-mixture port intermediate said scavenging-air port and said compression space, and means including a valve common to and adapted to open and close said scavenging-air and fuel-mixture ports in succession.

18. In an internal combustion engine, the combination of a cylinder provided with an exhaust port, and scavenging-air and fuel-mixture ports substantially opposite and intermediate said exhaust port and the compression space, and provided also with another scavenging-air port substantially opposite said exhaust port but farther from the compression space, and means to open and close the first-mentioned scavenging-air port and fuel-mixture port in succession.

19. In an internal combustion engine, the combination of a cylinder having two ports arranged in the side thereof, one nearer the compression space than the other, a piston working in said cylinder, and means to cause part of the charge to be taken from said cylinder through said nearer port during one compression stroke and returned to said cylinder through said other port during a subsequent compression stroke.

20. In an internal combustion engine, the combination of a cylinder having an outlet transfer port and an inlet transfer port, said outlet transfer port being nearer the compression space than said inlet transfer port, said cylinder being also provided with two air admission ports, one nearer the compression space than the other, but both farther from the compression space than said inlet transfer port, said cylinder being also provided with an exhaust port intermediate said air admission ports, considered with reference to the cycle, a piston working in said cylinder, and means to cause part of the charge to be taken from said cylinder through said outlet transfer port and returned to said cylinder through said inlet transfer port, and to prevent exhaust from passing out through said nearer air admission port during the power stroke, but permit air to pass into such air admission port during the compression stroke.

21. In an internal combustion engine, the combination of a cylinder having an outlet transfer port and an inlet transfer port, said outlet transfer port being nearer the compression space than said inlet transfer port, said cylinder being also provided with two air admission ports, one nearer the compression space than the other, but both farther from the compression space than said inlet transfer port, said cylinder being also provided with an exhaust port intermediate said air admission ports, considered with reference to the cycle, a piston working in said cylinder, means to cause part of the charge to be taken from said cylinder through said outlet transfer port and returned to said cylinder through said inlet transfer port, and to prevent exhaust from passing out through said nearer air admission port during the power stroke but permit air to pass into such air admission port during the compression stroke, and a valve for regulating the admission of air to said nearer air admission port.

22. In an internal combustion engine, the combination of a cylinder having an outlet transfer port and an inlet transfer port, said outlet transfer port being nearer the compression space than said inlet transfer port, said cylinder being also provided with two air admission ports, one nearer the compression space than the other, but both farther from the compression space than said inlet transfer port, said cylinder being also provided with an exhaust port intermediate said air admission ports, considered with reference to the cycle, a piston working in said cylinder, means to cause part of the charge to be taken from said cylinder through said outlet transfer port and returned to said cylinder through said inlet transfer port, and to prevent exhaust from passing out through said nearer air admission port during the power stroke but permit air to pass into such air admission port during the compression stroke, and automatic means for regulating the admission of air to said nearer air admission port.

23. In an internal combustion engine, the combination of a cylinder having an outlet transfer port and an inlet transfer port, said outlet transfer port being nearer the compression space than said inlet transfer port, said cylinder being also provided with two air admission ports, one nearer the compression space than the other, but both farther from the compression space than said inlet transfer port, said cylinder being also provided with an exhaust port intermediate said air admission ports, considered with reference to the cycle, a piston working in said cylinder, means to cause part of the charge to be taken from said cylinder through said outlet transfer port and returned to said cylinder through said inlet transfer port, and to prevent exhaust from passing out through said nearer air admission port during the power stroke but permit air to pass into such air admission port during the compression stroke, automatic means for regulating the admission of air to said nearer air admission port, and means providing for manual adjustment of said automatic means.

24. In an internal combustion engine, the combination of a cylinder, a piston working therein, means including an exhaust actuated member for supplying air to said cylinder, and means to cause a part of the air, after it has been compressed by said piston, to be taken from said cylinder and returned thereto on a following compression stroke of said piston.

25. In an internal combustion engine, the combination of a cylinder, a piston working therein, means including an exhaust actuated member for supplying air to said cylinder, and means including a valve to cause a part of the air, after it has been compressed by said piston, to be taken from said cylinder and returned thereto on a following compression stroke of said piston.

26. In an internal combustion engine, the combination of a cylinder, a piston working therein, means including an exhaust actuated member for supplying air to said cylinder, and means for causing the mixing of fuel with the air after the same has been compressed by said piston and causing a part of such compressed air to be taken from said cylinder and returned thereto on a following compression stroke of said piston.

27. In an internal combustion engine, the combination of a cylinder, a piston working therein, means for supplying regulated quantities of air under pressure to said cylinder, and means for causing the mixing of regulated quantities of fuel with the air after the same has been compressed to a higher pressure by said piston and causing a part of such compressed air to be taken from said cylinder and returned thereto on a following compression stroke of said piston.

28. In an internal combustion engine, the combination of a cylinder, a piston working therein, means for supplying air to said cylinder, and means including a valve for causing the mixing of fuel with the air after the same has been compressed by said piston and causing a part of such compressed air to be taken from said cylinder and returned thereto on a following compression stroke of said piston.

29. In an internal combustion engine, the combination of a cylinder, a piston working therein, means for supplying air under pressure to said cylinder, and means including a valve for causing the mixing of fuel with the air after the same has been compressed to a higher pressure by said piston and causing a part of such compressed air to be taken from said cylinder and returned thereto on a following compression stroke of said piston.

30. In an internal combustion engine operating on the constant volume cycle, the combination of a cylinder, a piston working therein, means including a valve for admitting air to said cylinder, means also including said valve to cause a part of the air, after it has been compressed by said piston, to be taken from said cylinder and returned thereto on a following compression stroke of said piston, and means also including said valve for causing fuel to be mixed with the air so returned to said cylinder.

31. In an internal combustion engine operating on the constant volume cycle, the combination of a cylinder, a piston working therein, means including said piston for admitting air to said cylinder, means including a valve to cause a part of the air, after it has been compressed by said piston, to be taken from said cylinder and returned thereto on a following compression stroke of said piston, and means including said valve for causing fuel to be mixed with the air so returned to said cylinder.

32. In an internal combustion engine operating on the constant volume cycle, the combination of a cylinder, a piston working therein, means for admitting automatically varied quantities of air to said cylinder, means to cause a part of the air, after it has been compressed by said piston, to be taken from said cylinder and returned thereto on a following compression stroke of said piston, and a carbureter for mixing fuel with the air so returned before the latter reaches said cylinder.

33. In an internal combustion engine operating on the constant volume cycle, the combination of a cylinder, a piston working therein, means for admitting air to said cylinder, means to cause a part of the air, after it has been compressed by said piston, to be taken from said cylinder and returned thereto on a following compression stroke of said piston, a carbureter for mixing fuel with the air so returned, and means for further atomizing and vaporizing the fuel after leaving said carbureter and before reaching said cylinder.

34. In an internal combustion engine operating on the constant volume cycle, the combination of a cylinder, a piston working therein, means for admitting air to said cylinder, means to cause a part of the air, after it has been compressed by said piston, to be taken from said cylinder and returned thereto on a following compression stroke of said piston, a carbureter for mixing fuel with the air so returned, and an atomizer and vaporizer intermediate said carbureter and said cylinder.

In testimony whereof, I have signed my name to this specification.

GEORGE L. BADGER.